United States Patent
Zhang et al.

(10) Patent No.: US 11,321,916 B1
(45) Date of Patent: May 3, 2022

(54) SYSTEM AND METHOD FOR VIRTUAL FITTING

(71) Applicants: Beijing Wodong Tianjun Information Technology Co., Ltd., Beijing (CN); JD.com American Technologies Corporation, Mountain View, CA (US)

(72) Inventors: Chi Zhang, Fremont, CA (US); Qingan Yan, San Jose, CA (US); Wanyan Zheng, Mountain View, CA (US); Hui Zhou, Sunnyvale, CA (US)

(73) Assignees: BEIJING WODONG TIANJUN INFORMATION TECHNOLOGY CO., LTD., Beijing (CN); JD.COM AMERICAN TECHNOLOGIES CORPORATION, Mou, CA (US)

( * ) Notice: Subject to any disclaimer, the term of this patent is extended or adjusted under 35 U.S.C. 154(b) by 0 days.

(21) Appl. No.: 17/138,263

(22) Filed: Dec. 30, 2020

(51) Int. Cl.
| | |
|---|---|
| G06T 17/20 | (2006.01) |
| G06T 15/04 | (2011.01) |
| G06T 9/20 | (2006.01) |
| G06T 7/246 | (2017.01) |
| G06T 13/40 | (2011.01) |
| G06V 40/10 | (2022.01) |

(52) U.S. Cl.
CPC ............ *G06T 17/20* (2013.01); *G06T 7/246* (2017.01); *G06T 9/20* (2013.01); *G06T 13/40* (2013.01); *G06T 15/04* (2013.01); *G06V 40/103* (2022.01); *G06T 2210/16* (2013.01)

(58) Field of Classification Search
None
See application file for complete search history.

(56) References Cited

U.S. PATENT DOCUMENTS

2012/0086783 A1* 4/2012 Sareen .................. G06T 19/00
348/47

OTHER PUBLICATIONS

Michael Garland, Paul S. Heckbert, Simplifying surfaces with color and texture using quadric error metrics, Proceedings of the Conference on Visualization '98, 1998, 263-269.

Jos Stam, Evaluation of loop subdivision surfaces, Computer Graphics Proceedings ACM SIGGRAPH 1998.

(Continued)

*Primary Examiner* — Frank S Chen
(74) *Attorney, Agent, or Firm* — Scully Scott Murphy & Presser

(57) ABSTRACT

A method for virtual fitting, includes providing a customer avatar and a garment model of a selected garment; registering the garment model to the customer avatar to obtain a dressed garment; capturing a motion image of the customer; performing simulation to the customer avatar and the dressed garment based on the motion image; rendering the simulated customer avatar-garment; and displaying the rendered avatar-garment on a displaying device. Rigging is performed to the dressed garment to obtain rigged garment, and cloth simulation is performed to the dressed garment model to obtain simulated cloth. Each vertex of the simulated cloth has a distance to nearest body mesh vertices on the simulated customer avatar, and the simulated garment is the rigged garment when the distance is less than 0 or the distance is greater than a threshold distance. Air mesh between the avatar and the garment is used for collision detection.

19 Claims, 11 Drawing Sheets

(56) References Cited

OTHER PUBLICATIONS

Hanwen Li, Yi Wan and Guanghui Ma, A fast collision detection method for clothing animation, 2012 IEEE 2nd International Conference on Cloud Computing and Intelligence Systems, 2012, 52-55.
Matthias Muller, Nuttapong Chentanez Tae-Yong Kim and Miles Macklin, Air meshes for robust collision handling, ACM Transactions on Graphics, 2015, Article 34(4): Article 133.
Peng Guan, Loretta Reiss, David A. Hirshberg, Alexander Weiss and Michael J. Black, DRAPE: DRessing any person, ACM Transactions on Graphics, 2012, 31(4): Article 35.
Min Tang, Tongtong Wang, Zhongyuan Liu, Ruofeng Tong and Dinesh Manocha, I-Cloth: incremental collision handling for GPU-based interactive cloth simulation, ACM Transactions on Graphics, 2018, 37(6): Article 204.
Rigging in wiki: https://en.wikipedia.org/wiki/Skeletal_animation.
Brent Burley, Physically Based Shading at Disney, SIGGRAPH 2012 Course: Practical Physically Based Shading in Film and Game Production.
Michael Ashikhmin, Simon Premoze, Distribution-based BRDFs, 2007.
David Neubelt, Matt Pettineo, Crafting a Next-Gen material pipeline for The Order: 1886, 2013, SIGGRAPH 2013 Course: Physically Based Shading in Theory and Practice.

* cited by examiner

| Layers | Bottom mesh area | Top mesh area | Body mesh area |
|---|---|---|---|
| 1 | All backface z test no stencil test | All front face z test no stencil test | |
| 2 | 1, 2 front face z test no stencil | | |
| 3 | | | 2 no cull z test, 3 no cull z test stencil test |
| Clear stencil buffer | | | |
| 4 | 3 frontface z test no stencil | 3 frontface z test no stencil | |
| 5 | | | 4 no cull z test stencil |
| Clear stencil buffer | | | |
| 6 | 4 front face z test no stencil | 4 front face z test no stencil | |
| 7 | | | 5 no cull test stencil |

FIG. 7

SYSTEM AND METHOD FOR VIRTUAL FITTING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to computer vision, and more particularly to systems and methods for real-time virtual fitting.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Fitting room plays an important role in garment shopping. It helps customers to find a proper garment with correct size and attractive styles. However, it takes a large space to build the fitting room, and it takes time for the customer to exchange garments in the fitting room. Further, online shopping is more and more popular today, but it is almost impossible for online commercial business to have a fitting room. Since the customers cannot try clothes before purchasing online, the lack of fitting room constitutes a major cause for garment returns. The high return rate increases the cost for the online commercial business and reduces customers shopping satisfaction.

As a replacement for the real fitting room, e-commerce platforms provide virtual fitting rooms. The customers can virtually try and change different garments before their purchase. The virtual fitting room can be an offline fitting room which may be located at a local store of the e-commerce platform, or can be an online fitting room where the customer may access from his personal computing device. The offline fitting room only takes a space of a mirror, where a customer can stand in front of the virtual fitting room and switch different garments they like instantly, without taking time for undressing and dressing. The online fitting room provides the opportunities that the customer can check, for example from home, the styling and fitness before purchasing. Virtual fitting improves customers shopping experiences, reduces return ratio, and therefore also reduces the business cost, which creates a win-win situation. However, it is a challenge to provide a real-time virtual fitting that displays movement of the customers and the garment with visual realism.

Therefore, an unaddressed need exists in the art to address the aforementioned deficiencies and inadequacies.

SUMMARY

In certain aspects, the present disclosure relates to a method for virtual fitting. In certain embodiments, the method includes:

providing, by a computing device, a customer avatar and a garment model of a selected garment;

registering, by the computing device, the garment model to the customer avatar to obtain a dressed garment model that is dressed on the customer avatar;

capturing, by an image capturing device, a motion image of the customer;

performing, by the computing device, simulation to the customer avatar based on the motion image to obtain simulated customer avatar;

performing, by the computing device, garment simulation to the dressed garment model to obtain simulated garment, wherein rigging is performed to the dressed garment model to obtain rigged garment, cloth simulation is performed to the dressed garment model to obtain simulated cloth, each vertex of the simulated cloth has a distance to at least one nearest body mesh vertex on the simulated customer avatar, and the simulated garment is the rigged garment when the distance is less than 0 or the distance is greater than a threshold distance;

rendering, by the computing device, the simulated customer avatar and the simulated garment to obtain rendered avatar-garment; and displaying the rendered avatar-garment on a displaying device.

In certain embodiments, the customer avatar is obtained by:

providing, by the computing device, a standard avatar;

capturing, by the image capturing device, a front image of the customer;

sending, by the image capturing device, the captured front image to the computing device;

detecting, by the computing device, the customer from the front image;

obtaining, by the computing device, body shape of the customer from the detected customer;

adjusting, by the computing device, the standard avatar using the body shape of the customer to obtain the customer avatar.

In certain embodiments, the garment simulation is a combination of the rigged garment and the simulated cloth. In certain embodiments, the combination is performed using a ratio at each vertex of the garment mesh, and the ratio between the rigged garment and the simulated cloth at each vertex of the garment mesh relates to the distance between the vertex in the simulated cloth and the corresponding vertex in the body mesh of the simulated avatar, or the distance from the vertex in the simulated cloth to the surface of the body mesh along a normal direction. The closer the distance, the higher the ratio of the rigged garment. But as described above, when the distance is greater than a threshold, the ratio of the rigged garment will be 1.

In certain embodiments, the front image are one or several T-pose images, where the customer stands straight up, legs together, arms fully extended.

In certain embodiments, the standard avatar has avatar feature keypoints, the customer avatar comprises customer avatar feature keypoints corresponding to the avatar feature points.

In certain embodiments, the garment model is obtained from a garment database, the garment database comprises a plurality of models of a plurality of garments, each of the plurality of models has garment feature keypoints corresponding to the avatar feature keypoints, and the step of registering the garment model to the customer avatar is performed based on the correspondence between the garment feature keypoints of the garment model and the customer feature keypoints of the customer avatar.

In certain embodiments, the feature keypoints of the customer avatar and the garment model correspond to each other, and the feature keypoints may include, for example, left shoulder (one keypoint), right shoulder (one keypoint), left armpit (one keypoint), right armpit (one keypoint), neck (two front keypoints and one back keypoint), chest (two keypoints), waist (two keypoints), belly (one keypoint), and hip (one keypoint).

In certain embodiments, the method further includes, before the step of capturing a motion image of the customer: capturing a plurality of T-pose images of the customer, and performing a pre-simulation of the customer avatar and the garment model. In certain embodiments, the pre-simulation is a few round of physical simulation, which may be performed on both the customer avatar and the garment model.

In certain embodiments, the method further includes:
reducing a number of surface polygons of body mesh of the customer avatar to obtain a simplified customer avatar;
establishing a correspondence between each body mesh vertex of the simplified customer avatar and a plurality of nearest body mesh vertices of the customer avatar;
performing the simulation using the simplified customer avatar to obtain the simulated customer avatar; and
rendering the customer avatar based on the correspondence between the simulated customer avatar and the customer avatar.

In certain embodiments, the pre-simulation is performed on the garment model against the simplified customer avatar.

In certain embodiments, the simplification of the customer avatar include removing the head, the front arm and the hands, the calves, and the feet from the customer avatar, and them reducing the rest of the customer avatar mesh by, for example quadric decimation method, to obtain the simplified avatar. The simplified avatar, for example, may have 500 triangles.

In certain embodiments, a number of the at least one nearest body mesh vertex is in a range of 5-10, and the distance is an average distance between each vertex of the simulated cloth and the number of nearest body mesh vertices on the simulated customer avatar. In certain embodiments, the average distance may be a mathematical average or a weighted average.

In certain embodiments, the at least one nearest body mesh vertex on the simulated customer avatar is located within a predefined radius relative to a location of the vertex of the dressed garment model. In certain embodiments, the radius may be a few centimeters.

In certain embodiments, the threshold distance is in a range of 1-10 centimeters. In certain embodiments, the threshold is in a range of 2-5 cm. In certain embodiments, the threshold is 3 cm. In certain embodiments, the threshold may be different for different types of garments, or different for different parts of the garments.

In certain embodiments, the determination of the distance being less than 0 or greater than the threshold is performed by counting the number of distances violating the criteria. For example, the method may determine the distance being less than 0 when 1 distance, 10 distances, or even 100 distances from 1, 10 or 100 vertices are less than 0; and determine the distance being greater than the threshold when 1 distance, 10 distances, or even 100 distances from 1, 10 or 100 vertices are greater than the threshold.

In certain embodiments, the step of rendering the simulated customer avatar and the simulated garment model is performed by:
rendering a first layer, comprising rendering all back face of bottom mesh of the simulated garment model with z test and no stencil test, and rendering all front face of top mesh area of the simulated garment model with z test and no stencil test;
rendering a second layer, comprising rendering areas 1 and 2 of front face of the bottom mesh with z test, and with no stencil test;
rendering a third layer, comprising rendering area 2 of the simulated customer avatar with no cull, and with z test, and area 3 of body mesh of the simulated customer avatar (both front and back) with no cull, with z test, and with stencil test;
clearing stencil buffer;
rendering a fourth layer, comprising rendering area 3 of the front face of the bottom mesh of the simulated garment model with z test and with no stencil test, and rendering area 3 of the front face of the top mesh of the simulated garment model with z test and with no stencil test;
rendering a fifth layer, comprising rendering area 4 of the body mesh of the simulated customer avatar (both front and back) with no cull, with z test, and with stencil test;
clearing stencil buffer;
rendering a sixth layer, comprising rendering area 4 of the front face of the bottom mesh of the simulated garment model with z test and with no stencil test, and area 4 of the front face of the top mesh of the simulated garment model with z test and with no stencil test; and
rendering a seventh layer, comprising rendering area 5 of the body mesh of the simulated customer avatar (both front and back) with no cull test and with stencil test,
where the areas 1, 2, 3, and 4 of the front face of the bottom mesh area respectively correspond to thighs, upper part above the thighs, right calf, and left calf, the areas 3 and 4 of the front face of the top mesh respectively correspond to left upper arm and right upper arm, and the areas 2, 3, 4, and 5 of the body mesh respectively correspond to head/forearms/hands/feet, left upper arm, right upper arm, and neck.

In certain embodiments, the texture of the garment is defined based on material of the garment.

In certain aspects, the present disclosure relates to a system for virtual fitting. In certain embodiments, the system includes a computing device, and an image capturing device and a displaying device connected to the computing device. The computing device has a processor and a storage device storing computer executable code, and the computer executable code, when executed at the processor, is configured to:
provide a customer avatar and a garment model of a selected garment;
register the garment model to the customer avatar to obtain a dressed garment model that is dressed on the customer avatar;
instruct the image capturing device to capture a motion image of the customer;
perform simulation on the customer avatar based on the motion image to obtain simulated customer avatar;
perform garment simulation on the dressed garment model to obtain simulated garment, wherein rigging is performed to the dressed garment model to obtain rigged garment, cloth simulation is performed to the dressed garment model to obtain simulated cloth, each vertex of the simulated cloth has a distance to at least one nearest body mesh vertex on the simulated customer avatar, and the simulated garment is the rigged garment when the distance is less than 0 or the distance is greater than a threshold distance;

render the simulated customer avatar and the simulated garment to obtain rendered avatar-garment model; and display the rendered avatar-garment model on a displaying device.

In certain embodiments, the computer executable code is configured to obtain the customer avatar by:

provide a standard avatar;

instruct the image capturing device to capture a front image of the customer;

upon receiving the captured front image from the image capturing device, detect the customer from the front image;

obtain body shape of the customer from the detected customer;

adjust the standard avatar using the body shape of the customer to obtain the customer avatar.

In certain embodiments, the customer avatar has customer avatar feature keypoints, the garment model has garment feature keypoints corresponding to the customer avatar feature keypoints, and the computer executable code is configured to register the garment model to the customer avatar based on the correspondence.

In certain embodiments, the computer executable code is further configured to:

reduce a number of surface polygons of body mesh of the customer avatar to obtain a simplified customer avatar;

establish a correspondence between each body mesh vertex of the simplified customer avatar and a plurality of nearest body mesh vertices of the customer avatar;

perform the simulation using the simplified customer avatar to obtain the simulated customer avatar; and render the customer avatar based on the correspondence between the simulated customer avatar and the customer avatar.

In certain embodiments, a number of the at least one nearest body mesh vertex is in a range of 5-10, the distance is an average distance between each vertex of the simulated cloth and the number of nearest body mesh vertices on the simulated customer avatar, and the threshold distance is in a range of 1-10 centimeters.

In certain embodiments, the computer executable code is configured to render the simulated customer avatar before rendering at least one area of the simulated garment.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 7 schematically depicts layered rendering sequence and rendering configurations according to certain embodiments of the present disclosure.

DETAILED DESCRIPTION

Figure 1:
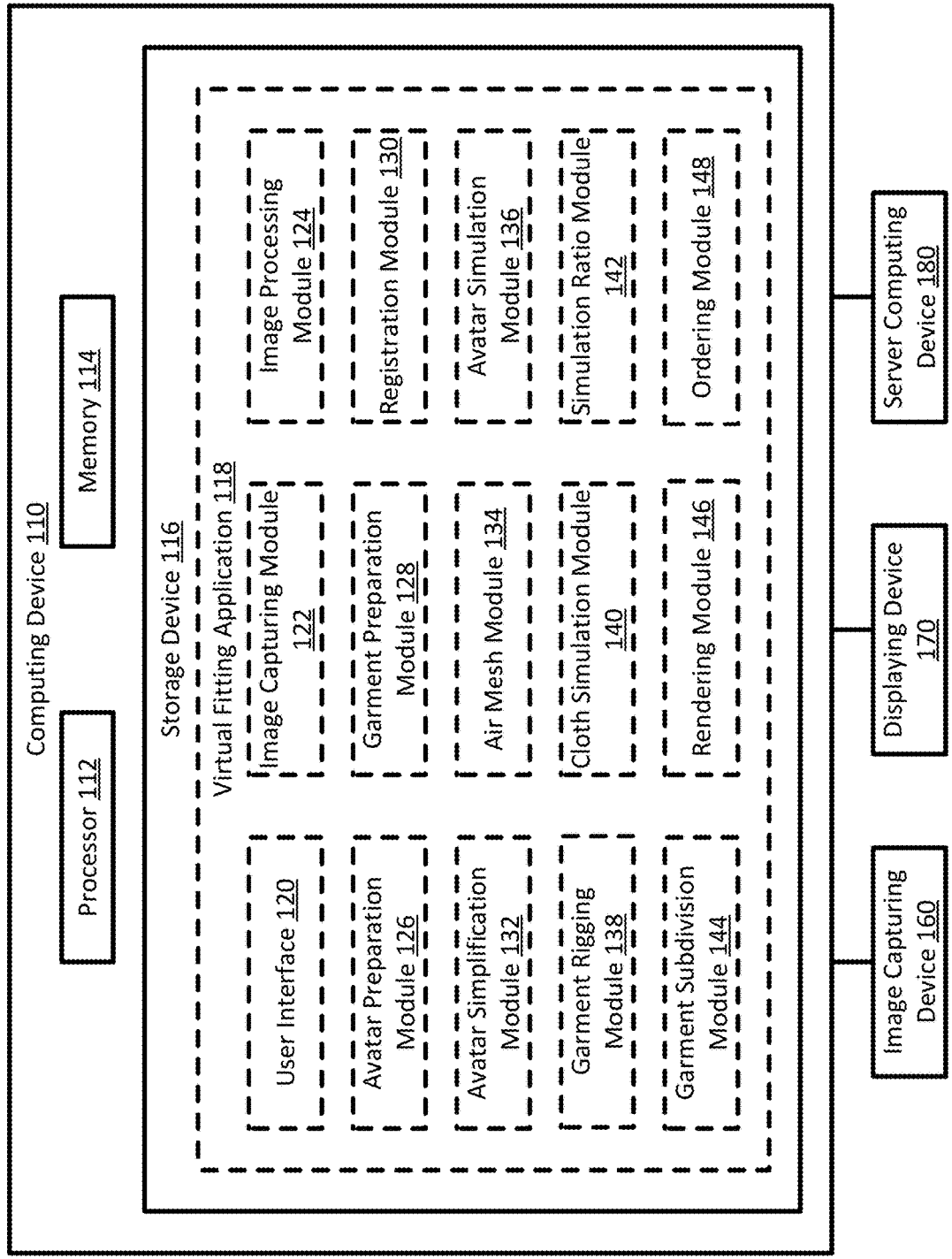
FIG. 1 schematically depicts a virtual fitting system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. As used herein, "plurality" means two or more. As used herein, the terms "comprising", "including", "carrying", "having", "containing", "involving", and the like are to be understood to be open-ended, i.e., to mean including but not limited to.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof. The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 schematically depicts a virtual fitting system according to certain embodiments of the present disclosure. As shown in FIG. 1, the system 100 includes a computing device 110, an image capturing device 160, a displaying device 170, and a server computing device 180. The image capturing device 160 and the displaying device 170 are connected to the computing device 110. The image capturing device 160 and the displaying device 170 face the same direction, and the image capturing device 160 is placed close to, for example on top of the displaying device 170, or integrated on the top frame or integrated on the screen of the displaying device 170. An area on a floor in front of the image capturing device 160 and the displaying device 170 is defined as an area of interest, which may be labeled as a circle or a square, and a customer can stand in the area of interest for virtual fitting. The area of interest is a suitable place for the image capturing device 160 to take video frames of the customer, and the customer stands in the area of interest can see the displaying device 170 clearly. In certain embodiments, the computing device 110 may be a server computer, a cluster, a cloud computer, a general-purpose computer, or a specialized computer, which provides virtual fitting service. In certain embodiments, the computing device 110 may communicate with other computing devices or services, so as to obtain three dimensional (3D) models of the garments, obtain product information, and place product orders. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media.

The image capturing device 160 is connected to the computing device 110, and is configured to capture images or video frames of the customer. The image capturing device 160 may be, for example, a video camera, a gray scale camera, a red-green-blue (RGB) camera, an RGB-depth (RGBD) camera, or a combination thereof. In certain embodiments, the image capturing device 160 is the RGB camera, which is sufficient for the virtual fitting function of the present disclosure. In certain embodiments, the image capturing device 160 is the RGBD camera, which can use the depth information in addition to the RGB images. In certain embodiments, the image capturing device 160 may further include a special depth camera, a light detection and ranging (LiDAR) sensor, or a sonar sensor, which is used to detect if the customer stands in the area of interest. The image capturing device 160 may be configured to capture video frames of the area of interest at a constant rate, or in variable rates. For example, the virtual fitting process may be defined by a standby mode, a preparation mode, a simulation mode, and an order mode. In the standby mode, the system waits for a customer to initiate a virtual fitting; in the preparation mode, the customer enters the area of interest and takes T-pose images, and selects a garment for virtual fitting, the virtual fitting application 118 provides an initial customer avatar based on the customer shape parameters from the T-pose images, and the garment is registered onto the customer avatar; in the simulation mode, the customer moves in the area of interest, the virtual fitting application simulates the movement onto the customer avatar-garment, renders the customer avatar-garment, and the rendered avatar-garment is shown in the displaying device 170; in the order mode, the customer places an order of the garment if he is satisfied with the virtual fitting effect. The image capturing device 160 may capture video frames in a slow rate in the standby mode and the preparation mode, capture video frames in a fast rate in the simulation mode, and suspend image capturing in the order mode.

The displaying device 170 is configured to display mirror images of the customer at real time. In certain embodiments, the displaying device 170 can be a liquid crystal (LCD), a light-emitting diode (LED), a plasma television, a projector, or any other forms of display capable of showing images provided by the computing device 110. In certain embodiments, the displaying device 170 is a touch screen display, and the customer can interact with an graphic user interface provided by the computing device 110 by touching the display. In certain embodiments, the displaying device 170 is configured to provide a gesture interaction mechanism, and the customer can interact with the graphic user interface shown on the displaying device 170 using gestures without actually touching the display. The gesture interaction includes, for example, sliding to browse, clicking to select, etc. The mirror images displayed on the displaying device 170 during virtual fitting include an avatar of the customer and a selected garment dressed on the customer avatar, and both the customer avatar and the selected garment are simulated and rendered according to the real time poses of the customer. The size of the displaying device 170 is substantially the same as the size of a dressing mirror, which could be similar to an average person's height. The length and width of the displaying device 170, for example, could be in a range of about 100 centimeters (cm)-200 cm and 30 cm-100 cm, respectively, but the size of the displaying device 170 is not limited to the above ranges.

The server computing device 180 is a server of an e-commerce platform, which is configured to provide garment information. In certain embodiments, the server computing device 180 stores three dimensional model and simulation parameters of the garments, which is accessible by the computing device 110. In certain embodiments, the server computing device 180 further provides an ordering system, functions to fulfil an order, for example instructed from the computing device 110.

As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand.

As shown in FIG. 1, the storage device 116 includes a virtual fitting application 118. The virtual fitting application 118 is configured to provide a virtual fitting room for customers. The virtual fitting application 118 includes, among other things, a user interface 120, an image capturing module 122, an image processing module 124, an avatar preparation module 126, a garment preparation module 128, a registration module 130, an avatar simplification module 132, an air mesh module 134, an avatar simulation module 136, a garment rigging module 138, a cloth simulation module 140, a simulation ratio module 142, a garment subdivision module 144, a rendering module 146, and an ordering module 148. In certain embodiments, the virtual fitting application 118 may include other applications or modules necessary for its operation. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the virtual fitting application 118 may be located at a remote computing device or distributed in a cloud.

The user interface 120 is configured to provide a user interface, for example, a graphic user interface, on the displaying device 170. In the standby mode of the virtual fitting application 118, which is the default mode, the user interface 120 is shown on the displaying device 170. The user interface 120 may provide a "START" option to start a virtual fitting process, and a "SELECT" option to select a garment. When the customer enters the area of interest and click the "START" button, or the image processing module 124 determines that the customer enters the area of interest, the virtual application 118 is configured to switch from the standby mode to the preparation mode. In the preparation mode, the user interface 120 is configured to, for example upon receiving an instruction from the image processing module 124 to switch to preparation mode, provide an instruction to the customer to stand in a T-pose. The user interface 120 is further configured to, for example upon receiving an instruction from the air mesh module 134 to switch to simulation mode, turn off the instruction to the customer, let the simulation result show on the displaying device 170, provide the garment selection option for the customer to change garment, and provide an order option for the user to order the garment. Kindly note that the displaying options of the user interface is not limited to the above description, as long as it can provide the functions of interacting with the customer for the purpose of constructing the customer avatar and the garment and showing the simulated avatar-garment.

The image capturing module 122 is configured to capture images of the predefined area of interest in front of the displaying device 170, and send the captured images to the image processing module 124. In particular, in the default standby mode, the image capture module 122 is configured to capture images of the predefined area at a first frame rate and send the captured image to the image processing module 124. When the image processing module 124 detects from the captured image that a customer enters the predefined area, the image processing module 124 would switch to preparation mode, and instruct the user interface 120 and the image capturing module 122 to switch to the preparation mode, such that the user interface 120 would show instruction to the customer to stand in T-pose, and the image capturing module 122 would take several T-pose images of the customer at a second frame rate, and send the T-pose images to the image processing module 124. When the preparation is completed by providing the customer avatar and the garment selected by the customer, and registering the garment to the customer avatar, the air mesh module 134 would instruct the image capturing module 122 to switch to the simulation mode, capture images of the customer at a third frame rate, and send the captured images to the image processing module 124. When the customer selects "EXIT" option or selects the "ORDER" option to order the garment via the user interface 120, the user interface 120 would instruct the image capturing module 122 to switch to order mode, where the image capturing module 122 may suspend taking images. In certain embodiments, the first frame rate may be a slow speed, such as 10 frames per second (fps), as long as the system 100 can detect the customer's entering into the area of interest at real time. In certain embodiments, the second frame rate may be the same as or is greater than the first frame rate, which could be, for example, 24 fps or 30 fps. In certain embodiments, the third frame rate is the same as or is greater than the second frame rate, which could be, for example, 24 fps, 30 fps, 60 fps or higher. In certain embodiments, the switching from the standby mode to the preparation mode may be performed by other means, for example, by detecting the existence of the user in the predefined area via an infrared wave, or when the image capturing device 160 is an RGBD camera, via depths of the camera to the object in the area of interest, or by selection of the "START" button by the customer via the user interface 120.

The image processing module 124 is configured to, upon receiving images from the image capturing module 122, process the images, and provide the processing result to at least one of the interface 120, the image capturing module 122, the avatar preparation module 126, and the avatar simulation module 136, and optionally the cloth simulation module 140. In particular, the default mode of the image processing module 124 is the standby mode, where the image processing module 124 is configured to, for each of the images received from the image capturing module 122, detect if a person exist in the image. The detection may include detecting the body and face of the customer. When the image processing module 124 detects that the customer stands in the area of interest, the image processing module 124 is configured to switch to the preparation mode, and instruct the user interface 120 and the image capturing module 122 to switch to the preparation mode. In the preparation mode, the user interface 120 is configured to provide the instruction to the customer to stand in T-pose, or any other poses that are suitable for avatar construction, and the image capturing module 122 is configured to capture several T-pose images or a short T-pose video using the image capturing device 160, and send the T-pose images to the image processing module 124. In the preparation mode, the image processing module 124 is configured to detect body shape parameters of the customer from the T-pose images, and send the body shape parameters of the customer to the avatar preparation module 126. The body shape parameters may include dimensions of different portions of the customer. In certain embodiments, the several T-pose images may correspond to different facing directions. For example, the image capturing device 160 may take the front, back, left and right images of the customer, such that the image capturing device 124 can obtain the body shape parameters accurately. When the air mesh module 134 sends a notice to the image processing module 124, indicating that the preparation is completed, the image processing module 124 is configured to switch to the simulation mode. At simulation mode, for each captured image, the image processing module 124 would track pose of the customer, and send the pose to the avatar simulation module 136 and optionally the cloth simulation module 140. In certain embodiments, the image processing module 124 may define a keyframe in every N number of captured images, perform a new detection on each keyframe, while only perform tracking on the non-keyframe images. In certain embodiments, N is a positive integer in a range of 5-100. In certain embodiment, N could be 5, 10, 20 or 30. In certain embodiments, keypoints are defined for image processing, and the image processing module 124 is configured to detect the keypoints of the customer, for example by a well-trained deep neural network model. In certain embodiments, the image processing module 124 is configured to use the keypoints for pose tracking. The keypoints may be joints in the skeleton of the customer, for example, keypoints of head, neck, left/right shoulder, left/right elbow, left/right wrist, center torso, left/right hip, left/right knee, left/right foot armpit. The keypoints may also include other featured points, such as hip or abdomen of the customer. Kindly note that the keypoints for pose determination may be different from the keypoints for registration. The number of keypoints, for example can be in the range of 10-40, such as 12, 17, 24, or 34. When the customer selects "ORDER" option in the user interface 120, the user interface 120 is configured to instruct the image capturing module 122 and the image processing module 124 to switch from the simulation mode to the order mode, and the image capturing module 122 and the image processing module 124 may be idle during the order mode.

In certain embodiments, if the customer changes a garment via the user interface 120, the user interface 120 is configured to instruct the garment preparation module 128 to retrieve the corresponding new garment model, register the new garment model to previously prepared customer avatar, calculate air mesh between the new garment and the customer avatar, so that the simulation on the new garment-customer avatar can be performed.

The avatar preparation module 126 is configured to, upon receiving the body shape parameters of the customer from the image processing module 124, prepare a customer avatar from a standard avatar, and send the customer avatar to the registration module 130. In certain embodiments, the avatar preparation is performed during the preparation mode, where the body shape parameters are obtained from the several T-pose images of the customer. In certain embodiments, components of the standard avatar include body mesh, body collider, body skeleton, and body motion driven matrix. In certain embodiments, the body mesh of the standard avatar includes about 6500 vertices, the neighboring vertices are connected by edges, and the edges form surface mesh triangles of the body mesh. In certain embodiments, the construction of the standard avatar may be similar to that of a skinned multi-person linear model (SMPL), but the standard avatar is completely customized. The body skeleton is defined based on the body mesh, and corresponds to a pose. The body motion driven matrix is used to, upon receiving the pose and the correspondence between the pose and the body skeleton, drive the movement of the body mesh. In certain embodiments, the standard avatar is labeled with 13 keypoints, including left shoulder (one keypoint), right shoulder (one keypoint), left armpit (one keypoint), right armpit (one keypoint), neck (two front keypoints and one back keypoint), chest (two keypoints), waist (two keypoints), belly (one keypoint), and hip (one keypoint). The avatar preparation module 126 is configured to adjust the standard avatar to the customer avatar, and the adjustment is performed based on the body shape parameters. In certain embodiments, the avatar preparation module 126 is configured to detect the keypoints in the customer image, and deform the standard avatar such that the keypoints of the customer avatar align well with the corresponding detected keypoints. The customer avatar has its body mesh, body collider, body skeleton, and body motion driven matrix, and is labeled with the 13 keypoints. The 13 keypoints of the customer avatar can be used in the registration described below.

Figure 2:
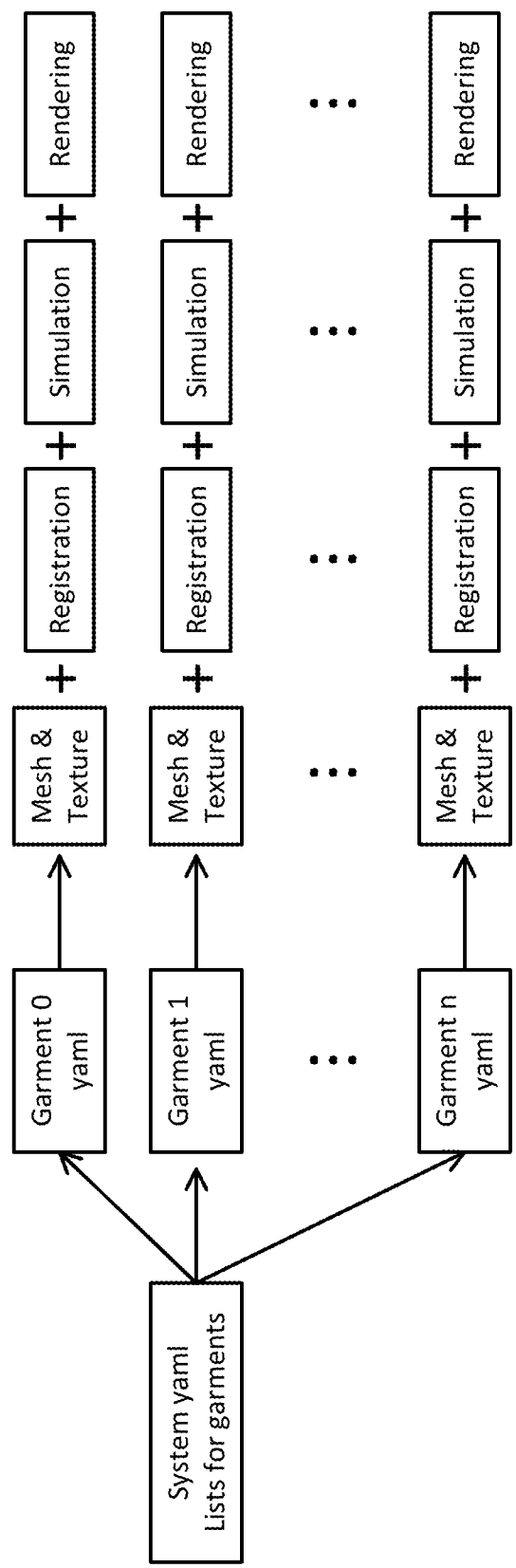
FIG. 2 schematically depicts system design of garments according to certain embodiments of the present disclosure.

The garment preparation module 128 is configured to, upon receiving the selection of the garment by the customer, for example from the user interface 120, retrieve the garment model for the selected garment, and send the retrieved garment model to the registration module 130. In certain embodiments, a garment model database is available in the computing device 110 or on the server computing device 180, which include 3D models of the garments. The garments may be for sale on the ecommerce platform. In certain embodiments, each garment is labeled with the 13 keypoints, and the 13 keypoints of the garment correspond to the 13 keypoints of the customer avatar one by one. FIG. 2 schematically depicts system design of all garments according to certain embodiments of the present disclosure. In certain embodiments, when the virtual fitting application 118 operates, the computing device 110 loads a system's yaml that contains a list of garment yamls. Each garment has its own folder which saves all related information: garment mesh, garment texture, and its information yaml, such as garment type, stock keeping unit (SKU) number, registration parameters, simulation parameters, and rendering parameters. Garment class serves as a container including garment mesh, and three structures: simulation structure (simu_), rendering structure (render_), and registration structure (reg_). Constructor is a string of a garment yaml file name. The garment mesh defines vertices and edges of the garment. The mesh may be a triangulated mesh. The information of the garment, in particular the material and the garment type, are important for defining stretching and compressing limits of the garment during simulation and rendering.

The registration module 130 is configured to, upon receiving the customer avatar from the avatar preparation module 126 and the garment model from the garment preparation module 128, register the garment model onto the customer avatar, perform rigid transformation of the garment model to align the garment model with the customer avatar, and send the aligned avatar-garment to the avatar simplification module 132. Registration is an essential session before simulation, as it offers the garment and virtual avatar an initial aligned pose. The registration is performed automatically.

As described above, the customer avatar includes a set of labeled keypoints, and the garment also include the same set of labeled keypoints. The labeled keypoints from the customer avatar and the garment correspond to each other, and may be, for example, keypoints of left shoulder (one keypoint), right shoulder (one keypoint), left armpit (one keypoint), right armpit (one keypoint), neck (two front keypoints and one back keypoint), chest (two keypoints), waist (two keypoints), belly (one keypoint), and hip (one keypoint). The registration module 130 assumes that both the garment and the customer avatar are rigid bodies, and the registration module 130 is configured to calculate a rigid transformation matrix based on the correspondence between the two sets of keypoints. The rigid transformation matrix may be a combination of a rotation matrix r and a translation vector t, which may be determined by using Kabsch algorithm. After calculating the matrix, the registration module 130 is configured to apply the matrix to the garment vertices to get the aligned garment mesh, which is now roughly fit to the outer surface of the customer avatar. In certain embodiments, the registration also considers deformation of the garment, such that the size of the garment is compatible with the size of the customer avatar. Kindly note that the garment may include one or more garments, such as a jacket and jeans, and the customer avatar is a T-pose 3D avatar.

By the above function of the registration model 130, the registration is achieved automatically and is suitable for any body sized customer. This is advantageous over related registration, such as the registration in game industry, where the size of the characters needs to be known in advance, and the registration have to be performed manually.

The avatar simplification module 132 is configured to, upon receiving the aligned customer avatar-garment, simplify the customer avatar to obtain a simplified avatar, perform a few rounds of physical simulation to the aligned garment against the simplified avatar to obtain aligned and pre-simulated garment, construct connection between the aligned avatar and the simplified avatar, send the simplified avatar and the aligned and pre-simulated garment to the air mesh module 134, send the aligned and pre-simulated garment to the cloth simulation module 140, and send the connection or correspondence and the aligned avatar to the rendering module 146. In certain embodiments, the simplification procedure not only meets the face number limit for the simulator, but also increases simulation speed. In certain embodiments, the simplified avatar contains 500 triangles. In certain embodiments, the avatar simplification module 132 is configured to use the quadric decimation method to simplify the customer avatar. In particular, the method places the edges of the customer avatar into a priority queue based on the calculated cost, which is an approximate measure of distance to the original surface, and pop out the edges in this queue in proper sequence. In certain embodiments, before the simplification to reduce the number of body mesh vertices, the avatar simplification module 132 remove the head portion, the forearm portions and hands, and the calves portions and the feet from the customer avatar, to reduce the body mesh to be simplified. The simplification is performed within the computing device 110 and only needs to be done once for the same customer. This is because that the body shape is usually consistent on different humans; the only thing have to be updated is the vertex position. In order to achieve that, a mapping table from the customer avatar to the compressed mesh (or simplified mesh, or simplified avatar) is established. This is done by computing nearest neighborhoods. For each vertex on the simplified mesh, the avatar simplification module 132 is configured to associate a nearest vertex on the customer avatar to it. That means, the grid topology is still consistent with the simplified mesh, yet the positions of the vertices of the simplified mesh derive from the exact input body shape and pose of the customer avatar. Every time when a new motion comes in, the simplified mesh will vary with it accordingly without conducting the simplification on every image.

Since the assumption of the garment as a rigid body will bring certain errors, such as penetration between the customer avatar and the garment, the avatar simplification module 132 is further configured to, after simplification of the avatar, perform or call the simulation function from other modules to perform a short physical simulation to fix the penetration region. The short physical simulation may also be named pre-simulation, and the pre-simulation is substantially performed on the aligned garment against the simplified avatar.

The air mesh module 134 is configured to, upon receiving the simplified avatar and the aligned and pre-simulated garment, construct a virtual mesh or air mesh between the simplified avatar and the garment, and send the simplified avatar, the aligned and pre-simulated garment, and the air mesh to the avatar simulation module 136. In certain embodiments, the air mesh connection between the simplified avatar and the garment mesh is set up via k-nearest neighbors algorithm (k-NN) search. In certain embodiments, the air mesh may also be constructed between the aligned garment and the high resolution customer avatar. In certain embodiments, the air mesh module 134 is further configured to monitor collision using the air meshes, and send a collision warning to the avatar simulation module 136 and the cloth simulation module 140 when there is a risk of collision. In certain embodiments, the monitoring is performed using edge distances between the garment vertices and the corresponding avatar vertices. When the distances are reduced to under a certain "dangerous value," the air mesh module 130 would send a warning to the avatar simulation module 136 and the cloth simulation module 140, such that higher collision resolution will be conducted in the simulation. Otherwise, collision resolution will be reduced.

Figure 3:
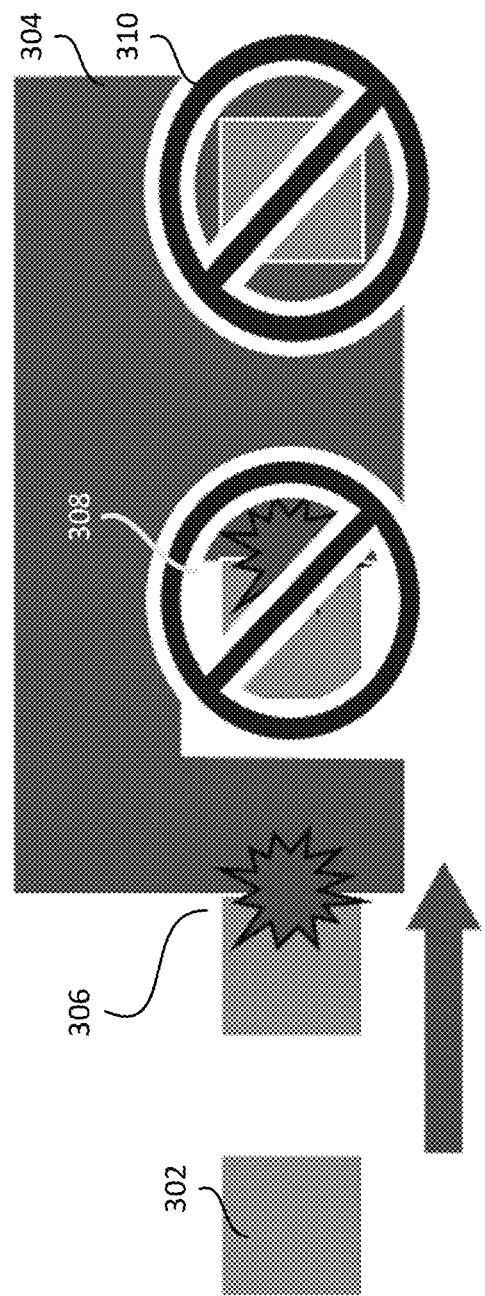
FIG. 3 schematically depicts examples of false collision and missed collision in simulation.

The inclusion of the air mesh in the application prevents missing collision or having false collision in physical simulation. FIG. 3 schematically depicts examples of false collision and missed collision. As shown in FIG. 3, the system includes a first object 302 and second object 304. Both the first objects 302 and the second object 304 are rigid body. At position 306, there is a small space between the first object 302 and the second object 304, but physical simulation of the system incorrectly determines that there is a collision between the two objects. At position 308, the system incorrectly predicts a collision, which results from the penetration of the first object 302 into the second object 304. In other words, the physical simulation might have missed a collision prediction close to the position 306. At position 310, the physical simulation incorrectly places the first object 302 inside the second object 304, which is likely caused by missing a collision completely.

Figure 4B:
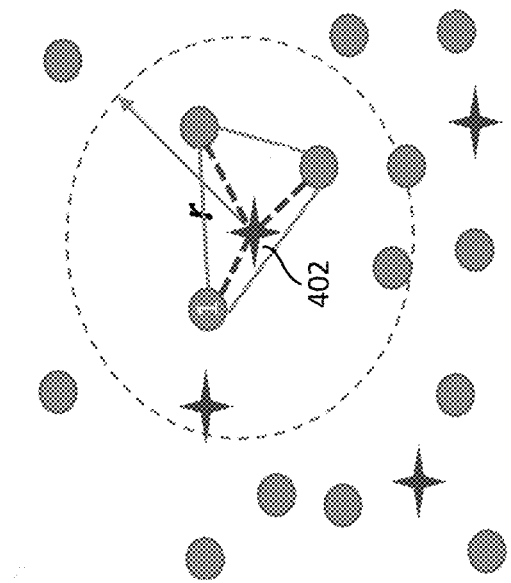
FIG. 4A and FIG. 4B schematically depict construction of air mesh according to certain embodiments of the present disclosure.
Figure 4A:
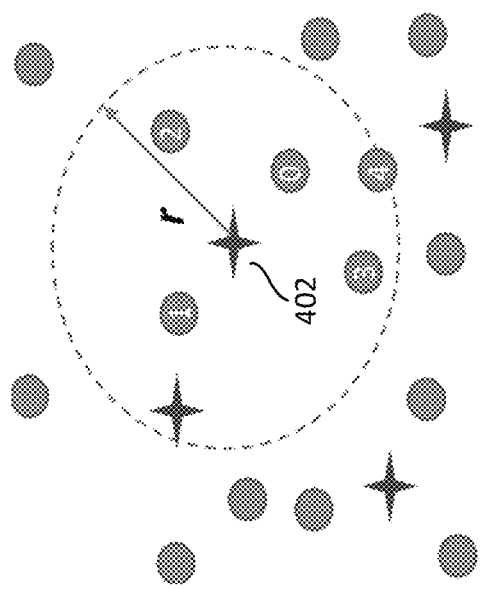

FIG. 4A and FIG. 4B schematically depict construction of the air mesh by the air mesh module 134 according to certain embodiments of the present disclosure. As shown in FIG. 4A, vertices of the garment mesh are indicted by stars, and vertices of the body mesh are indicated by solid dots. For the garment mesh vertex 402, a sphere is defined with a radius r and a center at the vertex 402. Three vertices 0, 1, and 2 on the body mesh of the simplified avatar are located within the sphere. Kindly note that the sphere is three dimensional, and the vertices 3 and 4 of the simplified avatar are actually located outside the sphere. Referring to FIG. 4B, dotted edges are drawn from the vertex 402 of the garment mesh to the vertices 0, 1 and 2 of the body mesh. The air mesh includes the vertices on the garment mesh and certain vertices on the body mesh of the simplified avatar, and the edges defined above that connect the vertices. In this embodiments, the nearest neighbors of each vertex of the garment mesh is searched using the sphere having the radius r, where r may be in a range of 0.1 centimeters (cm) to 5 cm. The r may be determined based on the garment type, where r may be 0.1 cm or less for a tight garment, 1 cm for a T-shirt, or 2 cm for a jacket. In certain embodiments, different portions of a garment may have a different r, where the r for the upper portion of a skirt could be 0.2 cm, and the r for the lower portion of the skirt could be 5 cm. In certain embodiments, the nearest neighbors for each vertex of the garment mesh may be searched using a number of nearest neighbors instead of the radius r. For example, when a number of nearest neighbors is set at five, then for each vertex of the garment mesh, the air mesh module 134 would search for five vertices from the body mesh of the simplified avatar that are the closest to the vertex of the garment mesh.

In certain embodiments, failure or crash of the avatar simulation and the garment simulation can be avoided by using the air mesh. The failure of the simulation may be caused by, for instance, customer body detection error or incorrectly assigned body ID due to random environment light change. Those errors from detection cost an illegal situation in physical simulation, where a very fast acceleration is applied due to quick velocity change or position change. Accelerations from these shaking or "position jumping" is huge, the force value calculated from Newton's law can be a gigantic value, may also be infinite. Numerical integration will fail to converge, and physical simulation can finally crash. Accordingly, the air mesh module 134 is configured to, after construction of the air mesh, monitor lengths of the edges of the air mesh. Once the edge lengths exceed a threshold, purely rigging based method will be applied to garment simulation to save physical simulation from crashing. Once the edge lengths go back to normal, physical simulation will regain its charge. In certain embodiments, the threshold of the lengths is a predefined number of a few cm, such as 3 cm, or 5 cm. In certain embodiments, when the edge lengths are negative, the air mesh module 134 is also configured to define the situation as simulation error, such that rigging based method is applied for the garment simulation. In certain embodiments, the air mesh module 134 is configured to determine a simulation error when the length of one of the edges of the air mesh is greater than the threshold or is negative. In other embodiments, the air mesh module 134 is configured to determine a simulation error when the lengths of a percentage of the edges of the air mesh, for example 1% of the air mesh edges, are greater than the threshold or are negative.

The construction of the air meshes is to avoid false collision detection in physical simulation of the simplified avatar and garment, and the air meshes are used for collision monitoring and also dynamically adjustment of ratio between cloth simulation and rigging to increase the whole system robustness. Collision detection is to find when and where the collision between two meshes occurs. When the faces for these two meshes are too much, collision detection is very expensive, which will greatly slow down the simulation speed. Simply lower collision detection can solve this problem, but induce penetration problem, and may even crash the whole simulation because of the failure of iteration numerical calculation. By using the air mesh for collision monitoring and garment rigging/cloth simulation ratio adjustment, the present disclosure not only reduces the computation needs, but also prevents penetration between the garment mesh and the simplified avatar mesh.

The avatar simulation module 136 is configured to, upon receiving the pose of the customer in one of the captured images from the image processing module 124 and the simplified avatar, the aligned garment, and the air mesh from the air mesh module 134, simulate mesh operations of the simplified avatar (the simulate mesh operation is also named the collider) based on the new pose to obtain simulated avatar, send the simulated avatar and the aligned garment to the garment rigging module 138, and send the simulated avatar, the air mesh and optionally the new pose to the cloth simulation module 140. The simplified avatar has body mesh, body collider, body skeleton, body motion driven matrix, and the garment mesh is registered with the garment. In the simulation mode, for each captured image, the image processing module 124 is configured to obtain a pose of the customer and send the pose to the avatar simulation module 136, where the pose corresponds to the body skeleton. The avatar simulation module 136, upon receiving the pose of the customer, use the body skeleton to drive movement of the body mesh using the body motion driven matrix, so as to update the pose of the simplified avatar at real time, the updated simplified avatar is named the simulated avatar. In certain embodiments, the motion driven matrix may be either loaded from file via a pre-saved binary file or may be re-calculated via cloning body motion driven matrix. The motion driven matrix may also be called skinning parameter or rigging matrix, which is applied to the body mesh of the simplified avatar.

The garment rigging module 138 is configured to, upon receiving the simulated avatar and the aligned garment, perform rigging on the garment mesh to obtain rigged garment, and send the rigged garment to the simulation ratio module 142. In certain embodiments, rigging clone function is conducted to estimate the motion driven matrix of the garment from the body. A fast k nearest neighbors (k-NN) algorithm via K-dtree method from body vertexes is first conducted for each garment vertex, and then weighted average from all surrounded body vertexes' motion driven coefficients is applied to estimate garment motion driven matrix. In particular, the vertices of the garment mesh and the vertices of the body mesh are defined in the same coordinate system, and the aligned garment mesh and optionally the air mesh are regarded as part of the body mesh of the simplified avatar. The motion driven matrix of the body mesh, according to the current pose of the customer, performs the simulation of the body mesh and the garment mesh together. Specifically, the motion driven matrix for the garment mesh is derived from the motion driven matrix for the body mesh, and the derivation is based on the k-NN shown in FIG. 4A and FIG. 4B. In certain embodiments, the derivation of the motion driven matrix for the garment mesh is performed using one of two different clone methods. The first method is weighted average via Euclidean distance from sample point to its neighbor vertexes. The second method uses local linear distribution via Tailor extension, and then solves the linear equation groups via singular value decomposition (SVD). Both methods uses the k near neighbors from a garment vertex to the body vertexes as described above in relation to FIG. 4A and FIG. 4B.

Figure 5:
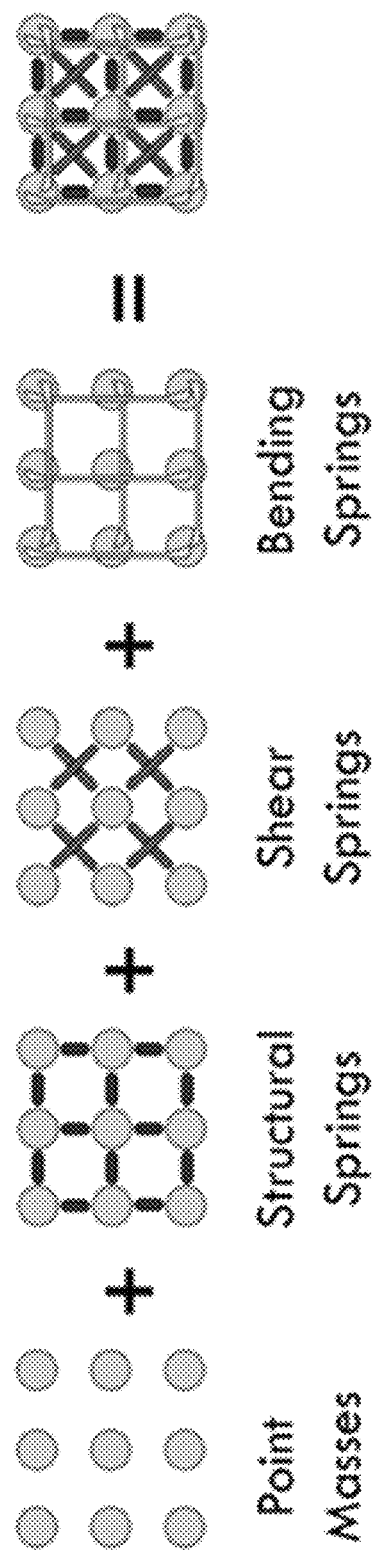
FIG. 5 schematically depicts mass-spring model cloth simulation or a garment simulation.

The cloth simulation module 140 is configured to, upon receiving the pose of the customer from the image processing module 124, the aligned and pre-simulated garment from the avatar simplification module 132, and the simulated avatar and the air mesh from the avatar simulation module 136, simulate the garment based on the pose of the customer to obtain simulated cloth, update the air mesh between the simulated avatar and the simulated cloth, and send the simulated cloth (garment), the simulated avatar, and the updated air mesh to the simulation ratio module 142. In certain embodiments, the cloth simulation is performed using mass-spring model. Kindly note that the edge lengths of the air meshes keeps changing with cloth simulation, while corresponding vertices indexes between body and garment is constant. FIG. 5 schematically depicts the mass-spring model for a cloth or a garment according to certain embodiments of the present disclosure. The dots or vertices in FIG. 5 represent evenly spaced masses, the nearby masses are connected by spring, the dots and the springs form a mesh. The motion equations of the model are Hooke's law and Newton's second law. Various additions, such as spring damping or angular springs, can be made. The mesh structure is used for storing the cloth and performing the simulation directly on it. Each vertex can store all of its own local information (velocity, position, forces, etc.) and when it comes time to render, the face information allows for immediate rendering as a normal mesh. In certain embodiments, when the air mesh is small and the simulated avatar and the simulated cloth is close, collision detection is performed to update the simulation of the simulated avatar and the simulated cloth. Kindly note that a successful garment simulation is different from pure cloth simulation. Due to the limitation of cloth model, mass-spring model, cloth always behaves too flexible to control.

If the body motion is not smooth, such as shaking, sudden movement, which come from internet transmission problem or from the delay for camera or computer vision functions, the physical simulation may crash. Thus, the cloth simulation should be improved or complemented by other means, such as rigging. On the other hand, rigging based method considers the garment mess as part of the whole body mesh, and therefore ignore the collision between these two. Its output is much stabler than physical simulation, but there will be no wrinkles from body motion. The visual realism is too terrible to convince customer virtual garment is real. Accordingly, the present disclosure achieves successful garment simulation by applying a hybrid method of these two as described below.

The simulation ratio module 142 is configured to, upon receiving the rigged garment from the garment rigging module 138 and the simulated avatar, the simulated cloth, and the updated air mesh from the cloth simulation module 140, determine a ratio between the simulated cloth and the rigged garment based on the updated air mesh, combine the simulated cloth and the rigged garment at the determined ratio to obtain simulated garment, and send the simulated avatar and the simulated garment to the garment subdivision module 144.

The reason to set the ratio is as follows. Rigged garment is much more robust and fast compared with cloth simulation, and rigged garment will not generate any penetration between garment mesh and body mesh. There is no need to calculate when and where collision happens, and of course no need to calculate collision reaction. As a consequence, no cloth wrinkles are generated either. On the other hand, mass-spring based cloth simulations are very slow, provide too many wrinkles, and sometimes fail to converge. To set the ratios, after the registration is finished, the corresponding distance between a garment vertex and a body vertex is used to approximate the combination ratio between garment rigging and cloth simulation. The corresponding distance serves as the degree of motion freedoms for each garment vertex particle. If the corresponding distance is 0, it means the cloth is tight. No wrinkle is needed for such a tight region. Pure rigging is applied for these regions. If the corresponding distance exceeds certain threshold, it means the cloth in these region is very loose, such as the end of a skirt. These places are wrinkle sensitive. Pure cloth simulation are applied for them. Combination ratios for other regions between these two special regions will be set between 0 and 1. In certain embodiments, the combination between the garment rigging and the cloth simulation is fitted using linear mapping based on the air mesh.

In certain embodiments, air mesh between the simulated avatar and the simulated cloth, which can be easily obtained, is used for determining the ratios. In certain embodiments, if the virtual edge distance along body mesh normal direction to the simulated cloth is too small, collision or penetration may happen; if the virtual distance is too big, penetration or simulation crash may happen. In either condition, rigging based garment motion will be activated to protect the simulation and penetration. Garment simulation within safe region along body normal direction is a combination between garment rigging and cloth simulation. The sum of rigging weight and cloth weight is 1. As the distance goes to too far or too near, rigging weight will smoothly change to 1 and cloth simulation weight goes to 0, as the distance goes to the average point (for example, about 0.5*far+0.5*near), cloth simulation weight goes to 1 and rigging weights goes to 0. With this dynamic control of the simulation ratio, garments on the simplified avatar are allowed simulation only within safe region. In certain embodiments, the ratio is approximated as a second order polynomial of the distance, but it is not limited to the second order. Higher order approximation may be used.

The garment subdivision module 144 is configured to, upon receiving the simulated avatar and the simulated garment from the simulation ratio module 142, subdivide the simulated garment, and send the subdivided garment and the simulated avatar to the rendering module 146. Because simulation of mesh is time-consuming, the present disclosure uses a low resolution garment mesh for the previous registration and simulation, and increase the resolution of the garment mesh for realistic rendering effect. Accordingly, the garment subdivision module 144 is configured to perform a subdivision operation to the simulated garment to obtain the subdivided garment before rendering. In certain embodiments, the subdivision is performed using loop subdivision algorithm. In particular, the garment subdivision module 144 is configured to divide each face of the simulated garment into four smaller triangles recursively. At the same time, besides the mesh, the texture coordinate of newly generated vertices are also interpolated from the original one.

The rendering module 146 is configured to, upon receiving the correspondence between the customer avatar and the simplified avatar from the avatar simplification module 132 and the subdivided garment and the simulated avatar from the garment subdivision module 144, correspond the simulated avatar to the customer avatar to change the pose of the customer avatar so as to obtain a current avatar, render the current avatar and the subdivided garment to obtain rendered avatar-garment, and send the rendered avatar-garment to the displaying device 170 to show the rendered avatar-garment. By corresponding the simulated avatar which is simplified with the customer avatar which is at high resolution, the rendering effect will be improved. In certain embodiments, unlike other virtual try on product which just use one baked map, the present disclosure builds a rendering pipeline and writing different shaders following physical based rendering rules and at the same time keep it real time. In particular, the rendering module 146 is configured to achieve realistic and real time rendering using (1) interpenetration, and (2) physical based rendering materials which render based on different clothes textures.

In regard to interpenetration, the present disclosure invents a special method to solve penetration problem, and avoid penetration of the garment mesh into the body mesh. The novel method builds multiple layers of shader to mimic some special material result. Specifically, the rendering module 146 is configured to cut the garment mesh and the body mesh into several pieces, record the faces index, and put the pieces into different layers which are rendered separately and based on special orders. In certain embodiments, after the layered rendering (or at the same time with the layered rendering), the disclosure also builds many cut planes, and use the cut planes to make borders. When the body faces are out of border, the body faces are not rendered. For the border plane, the disclosure finds the border of top garment (cuffs, collar, the bottom of garment), and build planes along the borders. The portion of the body mesh passing the boarder planes and enters the top garment is regarded as out of boarder. The disclosure tests the vertices of arms, neck, the bottom part of body, and the top part of bottom garment, and if they are out of the planes (enter into the top garment mesh), the disclosure don't render them. The disclosure also finds the top part of the bottom garment, and the bottom part of bottom garment, builds planes, tests the vertices of bottom part of body, if they are out of border (enter into the bottom garment mesh), the disclosure cuts them, and don't render them. In this way, for the portion of the body mesh (corner cases) that may cause penetration problem even after layered rendering, the disclosure can cull the portion of the body mesh, and don't need to render that portion.

Figure 6A:
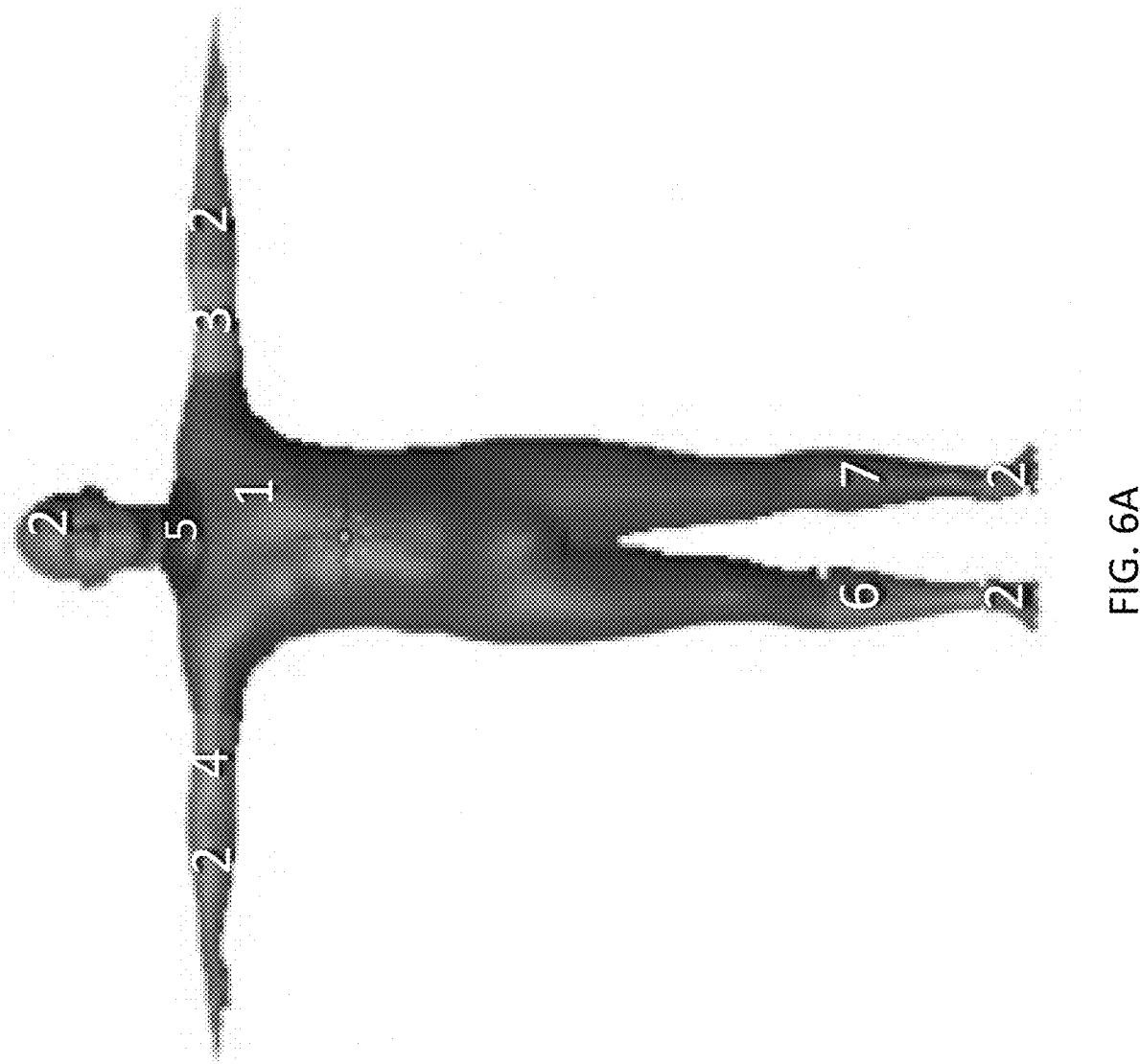
FIG. 6A schematically depicts index of body mesh of an avatar according to certain embodiments of the present disclosure.
Figure 6C:
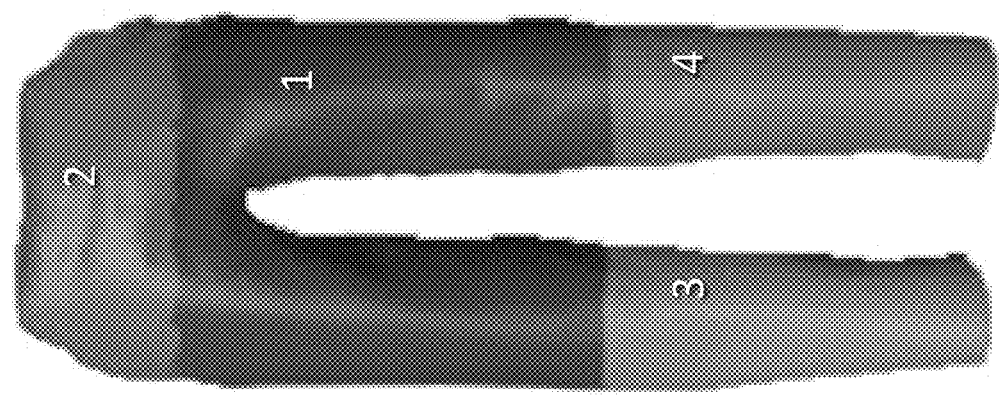
FIG. 6C schematically depicts index of bottom mesh of a garment according to certain embodiments of the present disclosure.
Figure 6B:
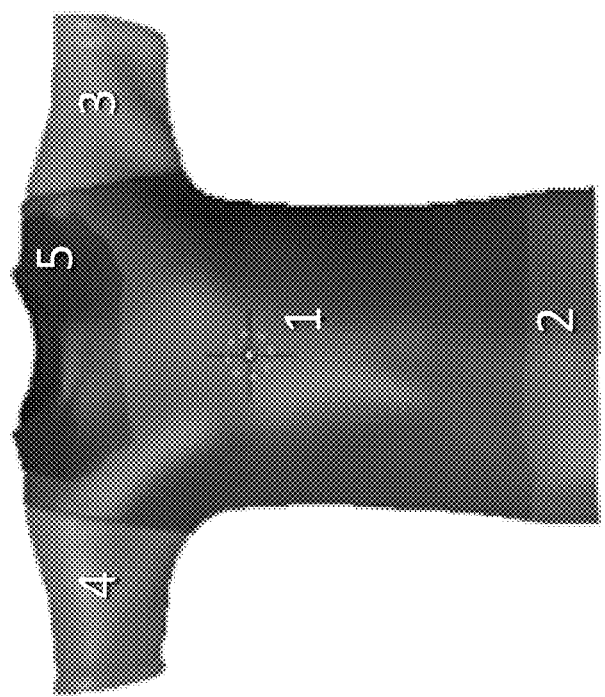
FIG. 6B schematically depicts index of top mesh of a garment according to certain embodiments of the present disclosure.
Figure 8C:
FIGS. 8A-8F schematically depicts rendering effects of a garment with different materials according to certain embodiments of the present disclosure.
Figure 8F:
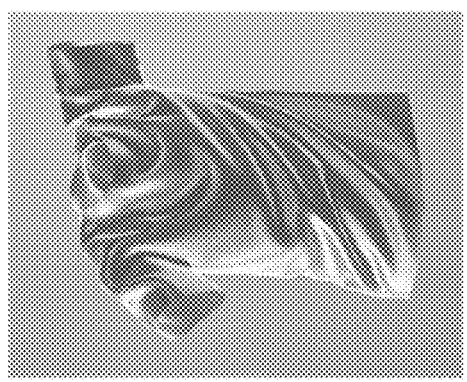
Figure 8B:
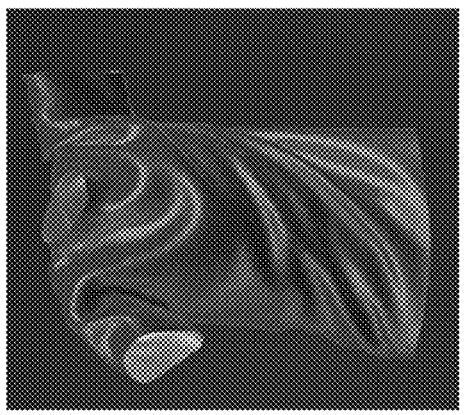
Figure 8E:
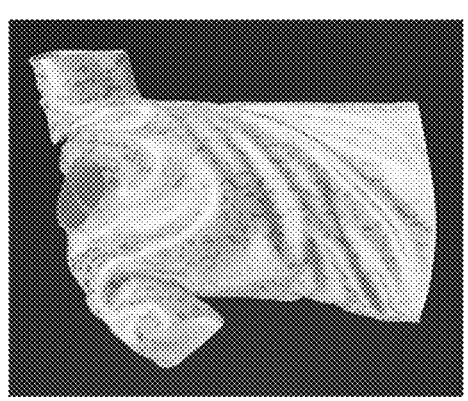
Figure 8A:
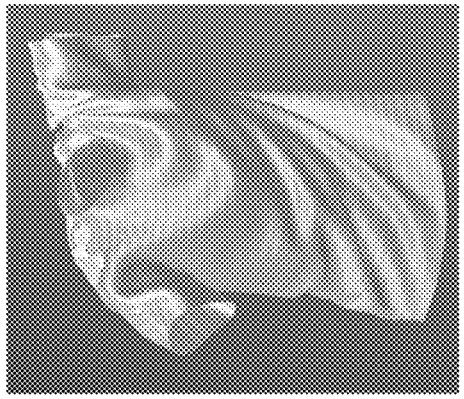
Figure 8D:
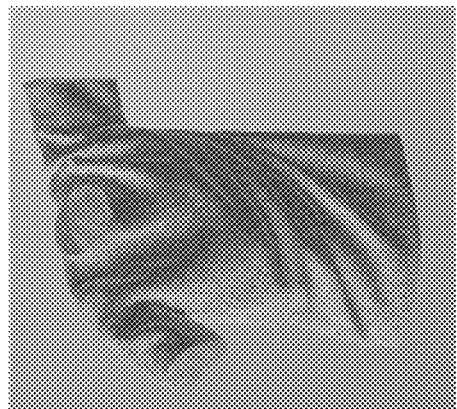

FIGS. 6A-6C schematically depict index of different portions of the body mesh, the top mesh of the garment mesh, and the bottom mesh of the garment mesh. As shown in FIG. 6A, index 1 corresponds to the main torso, index 2 includes head, forearms, hands, and feet, index 3 corresponds to left upper arm, index 4 corresponds to right upper arm, index 5 corresponds to neck, index 6 corresponds to right calf, and index 7 corresponds to left calf. As shown in FIG. 6B, index 1 corresponds to main part of the top garment mesh, index 2 corresponds to bottom part of the top garment mesh, index 3 corresponds to the left upper arm of the top garment mesh, index 4 corresponds to the right upper arm of the top garment mesh, and index 5 corresponds to the collar of the top garment mesh. As shown in FIG. 6C, index 1 corresponds to thighs of the bottom garment mesh, index 2 corresponds to upper part of the bottom garment mesh, index 3 corresponds to right calf part of the bottom garment mesh, and index 4 corresponds to left calf part of the bottom garment mesh. Kindly note only front face of the body mesh and the garment mesh are shown in FIGS. 6A-6C, the back face looks the same as the front face, and the indices in the back face is symmetrical to the indices in the front face.

FIG. 7 schematically depicts the layers of the rendering, where the layers 1 to 7 are rendered sequentially. For example, the rendering module 146 is configured to render the Layer 1 first, where all back face of the bottom garment mesh is rendered with z test and without stencil test, and all front face of the top garment mesh is rendered with z test and without stencil test. At Layer 4, index 3 area of the front face of the bottom garment mesh is rendered with z test and without stencil test, and index 3 area of the front face of the top garment mesh is rendered with z test and without stencil.

In regard to physical based rendering materials, the present disclosure considers that different texture of cloth materials looks different. In certain embodiments, for the texture of clothes, the present disclosure scans the real clothes, and capture its physical properties, such as diffuse, metallic, normal, specular, roughness, and so on. The present disclosure also writes special shaders based on its physical properties, select different microfacet bidirectional reflectance distribution functions (BRDFs). In certain embodiments, the present disclosure renders the 3D garment mesh according to its real cloth property, and the materials covered by the rendering include cotton, leather, silk, lace, velvet, and rain-coat like cloth. In certain embodiments, the present disclosure uses Neubelt et al. (2013) to define the features of the materials. FIGS. 8A-8F schematically shows different rendering effect of the same 3D garment structure with different garment materials.

By the combination of simplified avatar and the high resolution customer avatar correspondence, garment mesh subdivision, layered rendering, and rendering based on materials, the present disclosure achieves real-time and realistic rendering, and prevents penetration of the garment mesh to the body mesh.

Referring back to FIG. 1, the ordering module 148 is configured to, upon receiving an instruction from the customer that he would like to buy the garment via the user interface 120, complete the purchase order of the garment. During the ordering of the garment, the system may be switched to the order mode, such that no image capturing, processing and model simulation are required. In certain embodiments, the ordering module 148 is configured to fulfil the order automatically by sending the order of the garment to a warehouse, instruct a robotic device to pick up the garment from the warehouse, pack the garment into a package, and deliver the package through the logistic system of the e-commerce platform or through a shipping service provider.

In certain embodiments, the virtual fitting application 118 may not define the standby mode, the preparation mode, the simulation mode, and the order mode, and the function modules determine the operating steps based on the sequence of their inputted data. For example, the image capturing device 160 may be configured to capture images at a constant frame rate at all times. In certain embodiments, the virtual fitting application 118 may further include a scheduler, which is configured to schedule the data flow between the other modules of the virtual fitting application 118. The scheduler may determine different operation modes of the virtual fitting application 118 and switch modes based on the data flow, load the captured images to the memory 114, define keyframe images and non-keyframe images, and call different modules at different time to perform their function on the captured images. In certain embodiments, the virtual fitting application 118 may further include a managing interface for an administer of the system to provide the standard avatar, label the standard avatar and the garments, input rendering property of different garment materials, and configure or adjust other parameters of the application.

In certain embodiments, the virtual fitting application 118 is used in an offline store of a ecommerce company, and the customers can use the system 100 to aid the virtual fitting. In certain embodiments, the modules of the virtual fitting application 118 is modified, such that the customers can access the system 100 via their own terminals, such as a personal computing device, a smart phone, or a pad. The customer may take his own picture and upload the picture to the system, the system may use the picture to obtain a customer avatar based on a standard avatar, and the virtual application 118 may place model of the garment selected by the customer onto the customer avatar, define the simulated customer avatar-garment model in predefined poses, rendering the customer avatar-garment model, and display the rendered customer avatar-garment model with different poses on the customer terminal, such that the customer may place an order through the terminal if he is satisfied with the fitting result.

Figure 9:
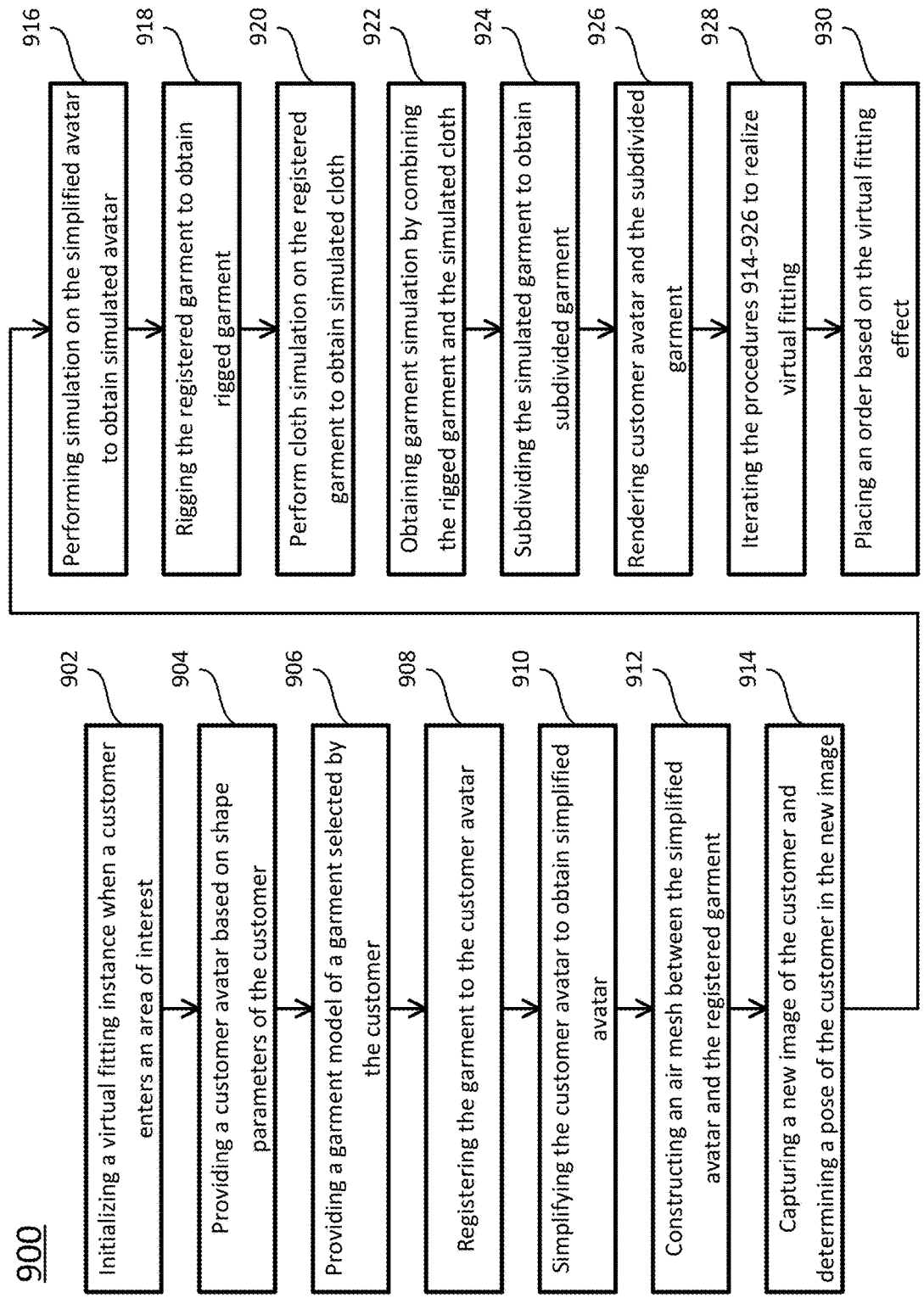
FIG. 9 schematically depicts a method for virtual fitting according to certain embodiments of the present disclosure.

In certain aspects, the present disclosure relates to a method for virtual fitting. FIG. 9 schematically depicts a method for virtual fitting according to certain embodiments of the present disclosure. In certain embodiments, the method is implemented by the computing device 110 shown in FIG. 1. It should be particularly noted that, unless otherwise stated in the present disclosure, the steps of the method may be arranged in a different sequential order, and are thus not limited to the sequential order as shown in FIG. 9.

At procedure 902, when a customer enters the area of interest in front of the image capturing device 160 and the displaying device 170, the image capturing device 160 takes an image and sends the image to the image processing module 124, the image processing module 124 processes the image and detects the customer in the image, switches to preparation mode, and instruct the user interface 120 and the image capturing module 122 the preparation mode, so as to initialize a virtual fitting instance.

At procedure 904, after the initialization of the instance, the user interface instructs the customer to stand in T-pose, the image capturing device 160 captures several T-pose images of the customer and sends the T-pose images to the image processing module 124, the image processing module 124 processes the T-pose images to obtain shape parameters of the customer and sends the shape parameters to the avatar preparation module 126, and in response to receiving the shape parameters, the avatar preparation module 126 adjusts a standard avatar using the shape parameters to obtain a customer avatar, and sends the customer avatar to the registration module 130.

At procedure 906, the user interface 120 provides garments for selection, the customer uses gestures to select a garment via the use interface 120, and the selection is forwarded to the garment preparation module 128. In response to receiving the selection, the garment preparation module 128 retrieves the model structure and parameters of the selected garment, and sends the garment model with parameters to the registration module 130.

At procedure 908, upon receiving the customer avatar from the avatar preparation module 126 and the garment model from the garment preparation module 128, the registration module 130 registers the garment model onto the customer avatar, and sends the registered garment and the customer avatar to the avatar simplification module 132.

At procedure 910, upon receiving the registered garment and the customer avatar, the avatar simplification module 132 simplifies the customer avatar to obtain simplified avatar, optionally performs a few rounds of physical simulation on the registered garment (or aligned garment) against the simplified avatar to obtain registered and pre-simulated garment, constructs correspondence between the simplified avatar and the customer avatar, sends the simplified avatar and the registered and pre-simulated garment to the air mesh module 134, sends the registered and pre-simulated garment to the cloth simulation module 140, and sends the correspondence to the rendering module 146.

At procedure 912, upon receiving the simplified avatar and the registered and pre-simulated garment, the air mesh module 134 constructs an air mesh between the simplified avatar and the registered and pre-simulated garment, and sends the simplified avatar, the registered and pre-simulated garment, and the air mesh to the avatar simulation module 136.

At procedure 914, the customer stands in front of the image capturing device 160 and the displaying device 170 and makes movement. The image capturing device 160 captures images continuously. For each captured image, the image capturing device 160 sends the image to the image processing module 124, the image processing module 124 detects a new pose of the customer in the captured image, and sends the new pose of the customer to the avatar simulation module 136.

At procedure 916, upon receiving the simplified avatar, the registered garment, the air mesh, and the new pose, the avatar simulation module 136 performs simulation, for example physical simulation on the simplified avatar based on the new pose to obtain simulated avatar, sends the simulated avatar and the registered and pre-simulated garment to the garment rigging module 138, and sends the simulated avatar, the air mesh, and optionally the new pose to the cloth simulation module 140 and the new pose.

At procedure 918, upon receiving the simulated avatar and the registered and pre-simulated garment, the garment rigging module 134 performs rigging on the registered and pre-simulated garment to obtain rigged garment, and sends the simulated avatar and the rigged garment to the simulation ratio module 142. In certain embodiments, the registered garment is treated as part of the body mesh of the simplified avatar, and the simulation of the simplified avatar at procedure 916 and the rigging of the registered garment at procedure 918 is performed as one step.

At procedure 920, upon receiving the registered and pre-simulated garment, the simulated avatar, the air mesh, and optionally the new pose, the cloth simulation module 140 performs cloth simulation on the registered and pre-simulated garment based on the new pose or the simulated avatar, to obtain simulated cloth, updates the air mesh between the simulated avatar and the simulated cloth, and sends the simulated avatar, the updated air mesh, and the simulated cloth to the simulation ratio module 142. In certain embodiments, the updated air mesh is used to determine whether a collision detection is needed during the simulation of the simplified avatar and the cloth. In certain embodiments, collision may be performed when the edge lengths of the updated air mesh are close to 0 or are negative.

At procedure 922, upon receiving the simulated avatar, the updated air mesh, the simulated cloth, and the rigged garment, the simulation ratio module 142 calculates edge lengths of the updated air mesh, determines simulation ratios based on the edge lengths, obtain garment simulation by combining the rigged garment and simulated cloth according to the simulation ratios, and sends the simulated avatar and the simulated garment to the garment subdivision module 144.

At procedure 924, upon receiving the simulated avatar and the simulated garment, the garment subdivision module 144 subdivides the simulated garment to obtain subdivided garment, and sends the simulated avatar and the subdivided garment to the rendering module 146.

At procedure 926, upon receiving the simulated avatar and the subdivided garment from the garment subdivision module 144, and the aligned avatar (customer avatar) and the correspondence between the simulated (simplified) avatar and the customer avatar from the avatar simplification module 132, the rendering module 146 changes the pose of the customer avatar (avatar at high resolution) to the pose of the simulated avatar (simplified avatar), renders the customer avatar and the subdivided garment in a layered sequence to obtain rendered avatar-garment, and sends the rendered avatar-garment to the displaying device 170 to display the rendered avatar-garment on the displaying device 170.

At procedure 928, for each captured image, the procedures 914-926 are iteratively performed to update the rendered avatar-garment show in the displaying device 170, so as to achieve the purpose of virtual fitting.

At procedure 930, if the customer satisfies with the garment and places an order through the user interface 120, the ordering module 148 places the order for the customer.

In certain embodiments, the customer may change another garment. For the new garment, there is no need to prepare a new customer avatar, but the preparation for the new garment model is needed. The virtual fitting of the new garment is basically the same as described above.

In certain embodiments, the customer may not find a garment for purchase and chooses to quit the virtual fitting. The customer may select an END button on the user interface to instruct the end of his virtual fitting instance, or the customer can simply exit the area of interest, and the detection of no human body in the image by the image processing module 124 may trigger the end of the virtual fitting instance.

Figure 10:
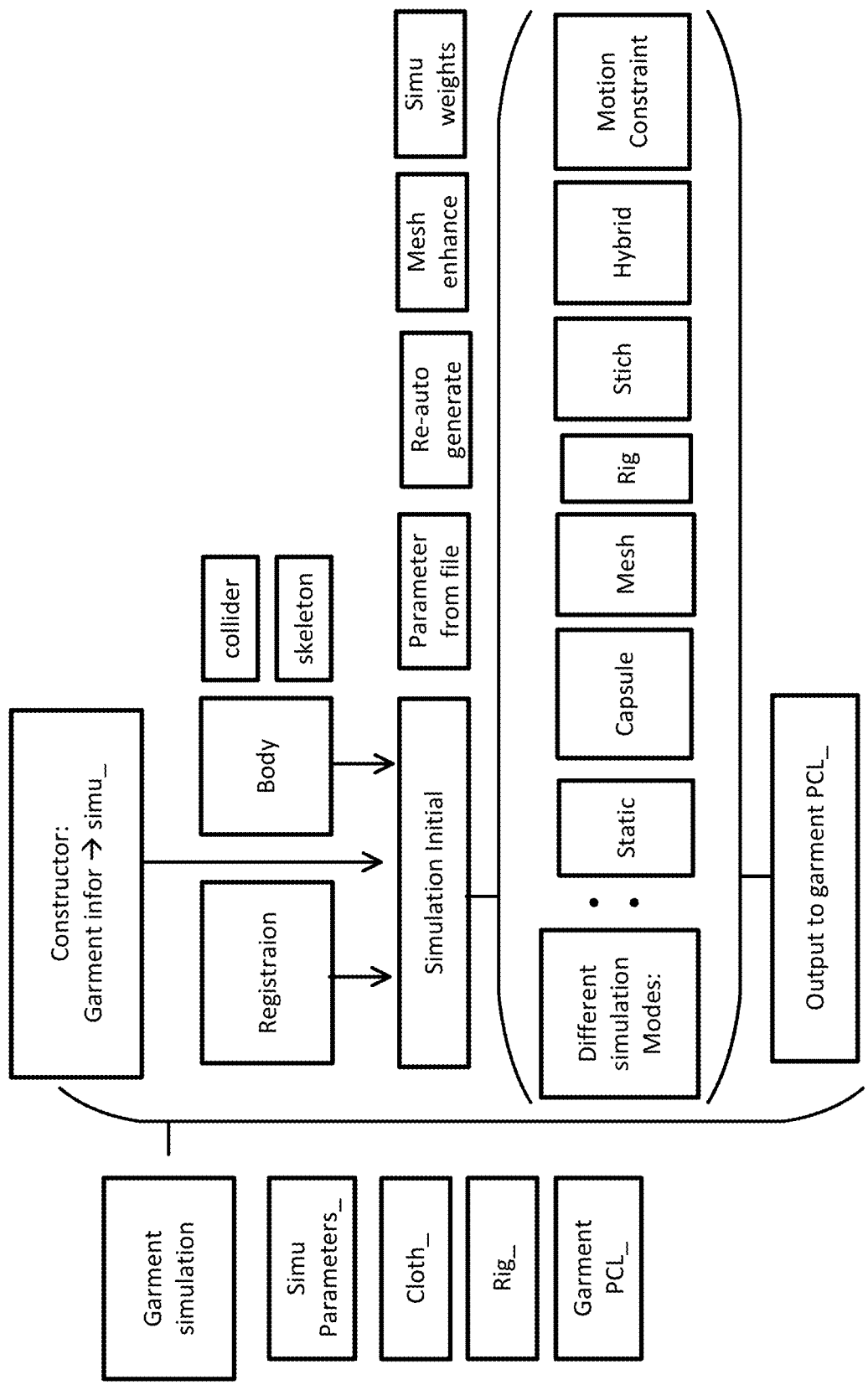
FIG. 10 schematically depicts a garment simulation class design according to certain embodiments of the disclosure.

As described above, the pipeline for virtual fitting of the disclosure may include real-time body and face detection, body and face tracking, body and face modeling to an avatar, real-time avatar motion driven, garment and avatar registration, real-time garment simulation and rendering. In certain aspects, the above systems and methods use a hybrid method for garment simulation, which is a combination of garment rigging and cloth simulation. In certain aspects, a system and method may also use different simulation method for different type of garments. FIG. 10 schematically depicts a garment simulation class design according to certain embodiments of the disclosure. As shown in FIG. 10, a garment simulation class consists of four member variables: simulation parameter, which is a structure container from garment information instance; cloth_ for cloth simulation, which is the original variable for cloth simulation; Rig_ for garment rigging, an instance for SMPLCore to simulate the mesh behavior directly controlled by skeleton joints; and GaremntPCL_, which includes both vertexes and triangle meshes of the garment.

During garment simulation, the constructor takes in input from garment simulation structure of a garment information instance. All basic settings for cloth simulation are set up.

The next step is registration and mesh operation. Registration is an essential session before simulation, which aligns the garment to the virtual customer avatar in an initial pose. The registration includes a rigid transformation of the garment onto the customer avatar based on the corresponding keypoints on the garment and the customer avatar. The customer avatar is simplified before the simulation. Further, a few round of simulation may be performed after the registration and the avatar simplification, so that the garment fits the simplified avatar well.

After the registration, simulation initialization can be performed using body mesh, body collider, body skeleton, body motion driven matrix, and the registered garment. For different garment, the system can choose one from the following different simulation models for the simulation. (a)

Static mode: assume the collider (body) is stable. The simulation is developed to release the collision between the garment and the body collider from the initial registration. (b) Capsule mode: body collider is approximated via spheres and capsules. Garment simulation is based on these colliders. (c) Mesh mode: body collider is approximated via low resolution polygon mesh, which is roughly 500 triangles. Garment simulation is based on the mesh colliders. (d) Rigging only mode: the garment simulation is purely driven by skeleton rigging method. This mode is quite useful for tight jean. (e) Stitching mode: a certain parts of garment particles are stitched to body model, and the rest of the particle are calculated via cloth simulation. This mode is very useful for skirt simulation. (f) Hybrid mode: garment simulation is approximated by the combination between rigging and garment simulation. This mode may divide into mesh hybrid and capsule hybrid. (h) Motion constrain mode: each simulated garment particle position is constrained within a properly radius of a defined position. This method can be applied in capsule mode, mesh mode, stitching mode, or hybrid mode. It enhances the simulation stability and generated more natural-looking wrinkles.

After simulation, the simulation result is outputted into a member variable called garmentPCL_, which will pass to rendering and other applications if needed.

In certain aspects, the present disclosure relates to a non-transitory computer readable medium storing computer executable code. The code, when executed at a processer of a computing device, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

Certain embodiments of the present disclosure, among other things, have the following beneficial advantages. (1) Automatic registration between a selected garment and an arbitrary avatar. Although game industry may be able to register a garment onto an avatar manually, both the garment and the avatar should be pre-known. In contrast, the present disclosure can register a garment onto any unknown avatar, and register the garment onto the unknown avatar automatically. The registration thus solves the automation problem of in virtual fitting, such that the method can be tailored to different customers. (2) Fully automatic rigging function. Tradition solutions, such as game industry, need artist to manually input rigging weights. In contrast, the present disclosure regards the garment mesh as an extension of the body mesh, and corresponds garment vertices and body face vertices through nearest neighbor method, such that the pose of the customer can be used to drive both the avatar and the garment. (3) Combination between garment rigging and cloth simulation. By monitoring distances between the body mesh and the garment mesh, the present disclosure hybrids the garment rigging and cloth simulation, and determines the ratio between garment rigging and cloth simulation automatically based on predefined rules. The combination thus provides fast and realistic simulation result. (4) Air mesh connection to reduce collision detection and increase the robustness for simulation. Collision detection is a time consuming process. By monitoring air mesh, the present disclosure only detect collision at high resolution when needed, which reduces computation cost without missing possible collision. (5) Mesh operations. In traditional solutions, such as game industry or animation industry, the mesh collider and mesh are generated manually and are directly used for simulation and rendering without further mesh operations. In contrast, the present disclosure simplifies the avatar before simulation and corresponds the simulated avatar to the high resolution one during rendering, and uses a decent garment model for simulation, and subdivides garment mesh after simulation for rendering, which reduces the computational cost for simulation, while still provides realistic rendering. (6) Solving penetration problem using rendering. In addition to solving the penetration problem by combining the garment rigging and cloth simulation, and detecting collision when needed, the present disclosure further provides a layered rendering approach to prevent penetration. Based on one or more of the above advantages, the present disclosure provides a real time virtual fitting pipeline, penetration due to fast movement of the customers is prevented, and the appearance of the virtual fitting is realistic.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

LISTING OF REFERENCES (INCORPORATED HEREIN BY REFERENCE IN THEIR ENTIRETY)

[1] Michael Garland, Paul S. Heckbert, Simplifying surfaces with color and texture using quadric error metrics, Proceedings of the Conference on Visualization '98, 1998, 263-269.

[2] Jos Stam, Evaluation of loop subdivision surfaces, Computer Graphics Proceedings ACM SIGGRAPH 1998.

[3] Stuyck Tuur, Barsky Brian A, Cloth Simulation for Computer Graphics (Synthesis Lectures on Visual Computing: Computer Graphics, A), 2018, Publisher: Morgan & Claypool Publishers.

[4] Hanwen Li, Yi Wan and Guanghui Ma, A fast collision detection method for clothing animation, 2012 IEEE 2nd International Conference on Cloud Computing and Intelligence Systems, 2012, 52-55.

[5] Matthias Muller, Nuttapong Chentanez Tae-Yong Kim and Miles Macklin, Air meshes for robust collision handling, ACM Transactions on Graphics, 2015, Article 34(4): Article 133.

[6] Peng Guan, Loretta Reiss, David A. Hirshberg, Alexander Weiss and Michael J. Black, DRAPE: DRessing any person, ACM Transactions on Graphics, 2012, 31(4): Article 35.

[7] Min Tang, Tongtong Wang, Zhongyuan Liu, Ruofeng Tong and Dinesh Manocha, I-Cloth: incremental collision handling for GPU-based interactive cloth simulation, ACM Transactions on Graphics, 2018, 37(6): Article 204.

[8] Rigging in wiki: https://en.wikipedia.org/wiki/Skeletal-_animation

[9] Brent Burley, Physically Based Shading at Disney, SIGGRAPH 2012 Course: Practical Physically Based Shading in Film and Game Production.
[10] Michael Ashikhmin, Simon Premoze, Distribution-based BRDFs, 2007.
[11] David Neubelt, Matt Pettineo, Crafting a Next-Gen material pipeline for The Order: 1886, 2013, SIGGRAPH 2013 Course: Physically Based Shading in Theory and Practice.

What is claimed is:

1. A method for virtual fitting, comprising:
providing, by a computing device, a customer avatar and a garment model of a selected garment;
registering, by the computing device, the garment model to the customer avatar to obtain a dressed garment model that is dressed on the customer avatar;
capturing, by an image capturing device, a plurality of T-pose images of the customer, and performing a pre-simulation of the customer avatar and the garment model;
capturing, by the image capturing device, a motion image of the customer;
performing, by the computing device, simulation to the customer avatar based on the motion image to obtain simulated customer avatar;
performing, by the computing device, garment simulation to the dressed garment model to obtain simulated garment, wherein rigging is performed to the dressed garment model to obtain rigged garment, cloth simulation is performed to the dressed garment model to obtain simulated cloth, each vertex of the simulated cloth has a distance to at least one nearest body mesh vertex on the simulated customer avatar, and the simulated garment is the rigged garment when the distance is less than 0 or the distance is greater than a threshold distance;
rendering, by the computing device, the simulated customer avatar and the simulated garment to obtain rendered avatar-garment; and
displaying the rendered avatar-garment on a displaying device.

2. The method of claim 1, wherein the customer avatar is obtained by:
providing, by the computing device, a standard avatar;
capturing, by the image capturing device, a front image of the customer;
sending, by the image capturing device, the captured front image to the computing device;
detecting, by the computing device, the customer from the front image;
obtaining, by the computing device, body shape of the customer from the detected customer; and
adjusting, by the computing device, the standard avatar using the body shape of the customer to obtain the customer avatar.

3. The method of claim 2, wherein the standard avatar comprises avatar feature keypoints, the customer avatar comprises customer avatar feature keypoints corresponding to the avatar feature points.

4. The method of claim 3, wherein the garment model is obtained from a garment database, the garment database comprises a plurality of models of a plurality of garments, each of the plurality of models has garment feature keypoints corresponding to the avatar feature keypoints, and the step of registering the garment model to the customer avatar is performed based on the correspondence between the garment feature keypoints of the garment model and the customer feature keypoints of the customer avatar.

5. The method of claim 1, further comprising:
reducing a number of surface polygons of body mesh of the customer avatar to obtain a simplified customer avatar;
establishing a correspondence between each body mesh vertex of the simplified customer avatar and a plurality of nearest body mesh vertices of the customer avatar;
performing the simulation using the simplified customer avatar to obtain the simulated customer avatar; and
rendering the customer avatar based on the correspondence between the simulated customer avatar and the customer avatar.

6. The method of claim 1, wherein a number of the at least one nearest body mesh vertex is in a range of 5-10, and the distance is an average distance between each vertex of the simulated cloth and the number of nearest body mesh vertices on the simulated customer avatar.

7. The method of claim 1, wherein the at least one nearest body mesh vertex on the simulated customer avatar is located within a predefined radius relative to a location of the vertex of the dressed garment model.

8. The method of claim 1, wherein the threshold distance is in a range of 1-10 centimeters.

9. The method of claim 1, wherein the step of rendering the simulated customer avatar and the simulated garment model is performed by:
rendering a first layer, comprising rendering back face of bottom mesh of the simulated garment model with z test and no stencil test, and rendering front face of top mesh of the simulated garment model with z test and no stencil test;
rendering a second layer, comprising rendering areas 1 and 2 of front face of the bottom mesh of the simulated garment model with z test and no stencil test;
rendering a third layer, comprising rendering area 2 of body mesh of the simulated customer avatar with no cull and z test, and area 3 of the body mesh with no cull, z test and stencil test;
clearing stencil buffer;
rendering a fourth layer, comprising rendering area 3 of the front face of the bottom mesh with z test and no stencil test, and rendering area 3 of the front face of the top mesh with z test and no stencil test;
rendering a fifth layer, comprising rendering area 4 of the body mesh with no cull, z test, and stencil test;
clearing stencil buffer;
rendering a sixth layer, comprising rendering area 4 of the front face of the bottom mesh with z test and no stencil test, and area 4 of the front face of the top mesh with z test and no stencil test; and
rendering a seventh layer, comprising rendering area 5 of the body mesh with no cull test and with stencil test,
wherein the areas 1, 2, 3, and 4 of the front face of the bottom mesh respectively correspond to thighs, upper portion above the thighs, right calf, and left calf, the areas 3 and 4 of the front face of the top mesh respectively correspond to left upper arm and right upper arm, and the areas 2, 3, 4, and 5 of the body mesh respectively correspond to head/forearms/hands/fee, left upper arm, right upper arm, and neck.

10. The method of claim 9, wherein texture of the garment is defined based on material of the garment.

11. The system of claim 10, wherein the computer executable code is configured to render the simulated customer avatar before rendering at least one area of the simulated garment.

12. A system for virtual fitting, wherein the system comprises a computing device, and an image capturing device and a displaying device connected to the computing device, the computing device comprises a processor and a storage device storing computer executable code, and the computer executable code, when executed at the processor, is configured to:
provide a customer avatar and a garment model of a selected garment;
register the garment model to the customer avatar to obtain a dressed garment model that is dressed on the customer avatar;
instruct the image capturing device to capture a plurality of T-pose images of the customer, and perform a pre-simulation of the customer avatar and the garment model;
instruct the image capturing device to capture a motion image of the customer;
perform simulation on the customer avatar based on the motion image to obtain simulated customer avatar;
perform garment simulation on the dressed garment model to obtain simulated garment, wherein rigging is performed to the dressed garment model to obtain rigged garment, cloth simulation is performed to the dressed garment model to obtain simulated cloth, each vertex of the simulated cloth has a distance to at least one nearest body mesh vertex on the simulated customer avatar, and the simulated garment is the rigged garment when the distance is less than 0 or the distance is greater than a threshold distance;
render the simulated customer avatar and the simulated garment to obtain rendered avatar-garment model; and
display the rendered avatar-garment model on a displaying device.

13. The system of claim 12, wherein the computer executable code is configured to obtain the customer avatar by:
provide a standard avatar;
instruct the image capturing device to capture a front image of the customer;
upon receiving the captured front image from the image capturing device, detect the customer from the front image;
obtain body shape of the customer from the detected customer; and
adjust the standard avatar using the body shape of the customer to obtain the customer avatar.

14. The system of claim 13, wherein the customer avatar has customer avatar feature keypoints, the garment model has garment feature keypoints corresponding to the customer avatar feature keypoints, and the computer executable code is configured to register the garment model to the customer avatar based on the correspondence.

15. The system of claim 12, wherein the computer executable code is further configured to:
reduce a number of surface polygons of body mesh of the customer avatar to obtain a simplified customer avatar;
establish a correspondence between each body mesh vertex of the simplified customer avatar and a plurality of nearest body mesh vertices of the customer avatar;
perform the simulation using the simplified customer avatar to obtain the simulated customer avatar; and
render the customer avatar based on the correspondence between the simulated customer avatar and the customer avatar.

16. The system of claim 12, wherein a number of the at least one nearest body mesh vertex is in a range of 5-10, the distance is an average distance between each vertex of the simulated cloth and the number of nearest body mesh vertices on the simulated customer avatar, and the threshold distance is in a range of 1-10 centimeters.

17. A non-transitory computer readable medium storing computer executable code, wherein the computer executable code, when executed at a processor of a computing device, is configured to:
provide a customer avatar and a garment model of a selected garment;
register the garment model to the customer avatar to obtain a dressed garment model that is dressed on the customer avatar;
instruct an image capturing device to capture a plurality of T-pose images of the customer, and perform a pre-simulation of the customer avatar and the garment model;
instruct the image capturing device to capture a motion image of the customer;
perform simulation on the customer avatar based on the motion image to obtain simulated customer avatar;
perform garment simulation on the dressed garment model to obtain simulated garment, wherein rigging is performed to the dressed garment model to obtain rigged garment, cloth simulation is performed to the dressed garment model to obtain simulated cloth, each vertex of the simulated cloth has a distance to at least one nearest body mesh vertex on the simulated customer avatar, and the simulated garment is the rigged garment when the distance is less than 0 or the distance is greater than a threshold distance;
render the simulated customer avatar and the simulated garment to obtain rendered avatar-garment model; and
display the rendered avatar-garment model on a displaying device.

18. The non-transitory computer readable medium of claim 17, wherein the computer executable code is further configured to
reduce a number of surface polygons of body mesh of the customer avatar to obtain a simplified customer avatar;
establish a correspondence between each body mesh vertex of the simplified customer avatar and a plurality of nearest body mesh vertices of the customer avatar;
perform the simulation using the simplified customer avatar to obtain the simulated customer avatar; and
render the customer avatar based on the correspondence between the simulated customer avatar and the customer avatar.

19. The non-transitory computer readable medium of claim 17, wherein a number of the at least one nearest body mesh vertex is in a range of 5-10, the distance is an average distance between each vertex of the simulated cloth and the number of nearest body mesh vertices on the simulated customer avatar, and the threshold distance is in a range of 1-10 centimeters.

* * * * *